US012791571B2

(12) United States Patent
Rodriguez García et al.

(10) Patent No.: US 12,791,571 B2
(45) Date of Patent: Nov. 10, 2026

(54) UNSUPERVISED TECHNIQUES FOR IDENTIFYING UNIVARIATE AND MULTIVARIATE ANOMALIES IN SCIENTIFIC INSTRUMENT RESULTS WITHIN A LABORATORY INFORMATION MANAGEMENT SYSTEM

(71) Applicants: FISHER SCIENTIFIC COSTA RICA SOCIEDAD DE RESPONSABILIDAD LIMITADA, San José (CR); THERMO ELECTRON LIMITED, Cambridge (GB)

(72) Inventors: Sebastián Dario Rodriguez García, San José (CR); David Hardy, Lymm (GB)

(73) Assignees: FISHER SCIENTIFIC COSTA RICA SOCIEDAD DE RESPONSABILIDAD LIMITADA, San José (CR); THERMO ELECTRON LIMITED, Cambridge (GB)

( * ) Notice: Subject to any disclaimer, the term of this patent is extended or adjusted under 35 U.S.C. 154(b) by 497 days.

(21) Appl. No.: 18/482,724

(22) Filed: Oct. 6, 2023

(65) Prior Publication Data

US 2025/0116678 A1 Apr. 10, 2025

(51) Int. Cl.
*G01N 35/00* (2006.01)

(52) U.S. Cl.
CPC . *G01N 35/00613* (2013.01); *G01N 35/00722* (2013.01); *G01N 2035/0091* (2013.01)

(58) Field of Classification Search
None
See application file for complete search history.

(56) References Cited

U.S. PATENT DOCUMENTS 10,311,442 B1 6/2019 Lancaster
2020/0363433 A1 11/2020 Gunn et al.
(Continued)

OTHER PUBLICATIONS

International Search Report and Written Opinion for Application No. PCT/IB2024/059253 dated Jan. 28, 2025 (9 pages).
(Continued)

*Primary Examiner* — Matthew D Krcha
(74) *Attorney, Agent, or Firm* — Michael Best & Friedrich LLP

(57) ABSTRACT

A method of detecting sample anomalies within a laboratory information management system includes obtaining a first result for a sample, processing the first result via a univariate machine learning model, processing a plurality of results for the sample via a multivariate machine learning model in response to the univariate machine learning model generating a normal output for the first result, and flagging, within the laboratory information management system, the sample for rejection processing in response to the multivariate machine learning model generating an abnormal output for the plurality of samples. The first result represents a first type of result, the univariate machine learning model is trained using unsupervised machine learning, the plurality of results includes the first result, each of the plurality of results represents a different type of result for the sample, and the multivariate machine learning model trained using unsupervised machine learning.

20 Claims, 14 Drawing Sheets

(56) References Cited

U.S. PATENT DOCUMENTS

| | | | |
|---|---|---|---|
| 2020/0378891 | A1 | 12/2020 | Andrecka et al. |
| 2022/0319650 | A1 | 10/2022 | Lippok et al. |

OTHER PUBLICATIONS

Lee, G., et al. "Unsupervised anomaly detection of the gas turbine operation via convolutional auto-encoder." 2020 IEEE International Conference on Prognostics and Health Management (ICPHM). IEEE, 2020 (6 pages).

Ke et al., "Machine learning-based in-hospital mortality prediction models for patients with acute coronary syndrome," American Journal of Emergency Medicine, 53, 2022, pp. 127-134.

Rosenbaum et al., "Using Machine Learning-Based Multianalyte Delta Checks to Detect Wrong Blood in Tube Errors," American Journal of Clinical Pathology, vol. 150 (6), 2018, pp. 555-566.

Zeadna et al., "Prediction of sperm extraction in non-obstructive azoospermia patients: a machine-learning perspective," Human Reproduction, vol. 35 (7), 2020, pp. 1505-1514.

UNSUPERVISED TECHNIQUES FOR IDENTIFYING UNIVARIATE AND MULTIVARIATE ANOMALIES IN SCIENTIFIC INSTRUMENT RESULTS WITHIN A LABORATORY INFORMATION MANAGEMENT SYSTEM

TECHNICAL FIELD

Various embodiments relate generally, but not exclusively, to scientific instruments and scientific instrument support apparatuses, such as data processing and analysis systems for data generated by scientific instruments.

SUMMARY

Scientific instruments can generate anomalous data for a variety of reasons. For example, individual instruments may be incorrectly calibrated or malfunctioning. Such instruments could potentially generate inconsistent or incorrect data. Environmental interferences can also impact data generated by scientific instruments. For example, variances in environmental conditions such as temperature, humidity, pressure, and/or electromagnetic interference can cause scientific instruments to generate anomalous data. Furthermore, the conditions of samples being tested can also lead to anomalous data. Contaminated, degraded, or improperly prepared samples can cause scientific instruments to generate anomalous data. It is often important for scientific laboratories—particularly laboratories utilizing a high-degree of automation—to have processes for identifying anomalous data. For example, detecting anomalous data allows laboratories to ensure the integrity and reliability of data provided to clients and end users. However, due to the complexity of modern laboratories—which can generate large amounts of data from many different scientific instruments at a fast pace—identifying anomalous data can be technically challenging.

Various techniques can be used to detect anomalous results in test data generated by scientific instruments. Pre-defined thresholds can be used to identify anomalous data. For example, test data analysis software can flag data that exceeds a pre-defined threshold as anomalous. However, these and other rule-based approaches to identifying anomalous results can be technically challenging to implement. For example, threshold-based techniques require well-defined sets of thresholds to be set for each type of data. These thresholds may be difficult to define and are not always available. Furthermore, such thresholds require subject matter experts to set, and the usefulness of the thresholds are often limited by the experience and knowledge of the subject matter experts. Additionally, while threshold-based techniques are well-suited to detecting univariate anomalies in test data, they may nevertheless miss other types of anomalous data.

In some scenarios, each individual variable in the test data might appear to be behaving normally. Each data point may fall within an expected range, with no significant deviations or outliers. For example, if the scientific instrument is measuring both temperature and pressure in a chemical reaction, both may fall within an expected range. However, when these variables are analyzed together, the relationships between the variables might not be as expected—and the test data might be considered univariate non-anomalous but multivariate anomalous. In the example where the scientific instrument is measuring both temperature and pressure, temperature and pressure might be expected to increase together. However, if the test data shows that temperature is increasing while pressure is remaining constant or decreasing, then the relationship between the multiple variables could suggest that the test data is anomalous—which could suggest malfunctions in the scientific instrument and/or errors in the data recording. While such inconsistent relationships may be manually spotted by a subject matter expert in low-dimensional test data, these types of anomalous relationships are almost impossible for human users to spot in high-dimensional, high-throughput test data. Thus, identifying multivariate anomalous relationships in complex, high-dimensional, high-throughput scientific instrument test data may be challenging or impossible for skilled human users—even when aided by test data analysis software.

Accordingly, what is needed are software solutions for laboratory information management systems that are capable of automatically processing high-dimensional, high-throughput sets of scientific instrument test data to consistently identify both univariate and multivariate anomalies without relying on subjective and potentially inconsistent human judgment.

A method of detecting sample anomalies within a laboratory information management system includes obtaining a first result for a sample within the laboratory information management system, processing the first result via a univariate machine learning model within the laboratory information management system, processing, within the laboratory information management system, a plurality of results for the sample via a multivariate machine learning model in response to the univariate machine learning model generating a normal output for the first result, and flagging, within the laboratory information management system, the sample for rejection processing in response to the multivariate machine learning model generating an abnormal output for the plurality of samples. The first result represents a first type of result, the univariate machine learning model is trained using unsupervised machine learning, the plurality of results includes the first result, each of the plurality of results represents a different type of result for the sample, and the multivariate machine learning model trained using unsupervised machine learning.

In other features, processing the plurality of results via the multivariate machine learning model includes generating an input vector from the plurality of results and providing the input vector to the multivariate machine learning model to generate an output vector. In other features, the method includes generating the abnormal output for the plurality of results in response to an anomaly score computed based on a comparison of the input vector and the output vector exceeding a threshold value. In other features, the method includes setting the threshold value based on a training dataset. Setting the threshold value based on the training dataset includes loading a training dataset including training results for a plurality of training samples, inputting the training results to the multivariate machine learning model to generate training outputs, computing differences between the training results and the training outputs, and computing the threshold value based on the differences.

In other features, computing the threshold value based on the differences includes ordering the differences in ascending order, computing a first training value based on a lower percentile threshold of the ordered differences, computing a second training value based on an upper percentile threshold of the ordered differences, computing a first range based on a difference between the first training value and the second training value, and computing the threshold value as a function of the second training value and the first range. In other features, the multivariate machine learning model includes a neural network. In other features, the neural network includes an autoencoder. In other features, the neural network includes a variational autoencoder. In other features, the multivariate machine learning model is configured to identify anomalous features in the plurality of results. In other features, the method includes generating the abnormal output for the plurality of results in response to identifying anomalous features in the plurality of results. In other features, the multivariate machine learning model is an isolation forest model. In other features, the multivariate machine learning model is a local outlier factor model. In other features, the multivariate machine learning model is a one-class support vector machine.

In other features, the method includes training the univariate machine learning model. Training the univariate machine learning model includes loading a plurality of training results from the laboratory information management system, ordering the plurality of training results in ascending order, computing a first observation value based on a lower percentile threshold of the ordered plurality of training results, computing a second observation value based on an upper percentile threshold of the ordered plurality of training results, computing a second range based on a difference between the first observation value and the second observation value, setting a minimum threshold as a function of the first observation value and the second range, and setting a maximum threshold as a function of the second observation value and the second range. Each result of the plurality of training results is the first type of result. In other features, the method includes generating the normal output for the first result in response to determining the first result does not exceed the maximum threshold.

In other features, the method includes generating the normal output for the first result in response to determining the first result is not below the minimum threshold. In other features, the method includes generating an abnormal output in response to determining the first result exceeds the maximum threshold or is below the minimum threshold. In other features, the method includes flagging the sample for rejection processing includes generating a notification on a graphical user interface. The notification includes at least one of (i) anomaly scores per feature, (ii) graphs, or (iii) graphical representations of clusters. In other features, the method includes flagging the sample for rejection processing includes flagging the sample for manual processing. In other features, the method includes flagging the sample for rejection processing includes adding, within the laboratory information management system, an anomaly tag to the plurality of results.

In other features, one or more non-transitory computer-readable media include instructions thereon that, when executed by one or more processing devices of a scientific instrument support apparatus, cause the scientific instrument support apparatus to perform the method.

A scientific instrument support apparatus includes memory hardware configured to store instructions and processing hardware configured to execute the instructions. The instructions include obtaining a first result for a sample within a laboratory information management system, processing, within the laboratory information management system, the first result via a univariate machine learning model trained using unsupervised machine learning, processing, within the laboratory information management system, a plurality of results for the sample via a multivariate machine learning model in response to the univariate machine learning model generating a normal output for the first result, and flagging, within the laboratory information management system, the sample for rejection processing in response to the multivariate machine learning model generating an abnormal output for the plurality of samples. The first result represents a first type of result, the plurality of results include the first result, each of the plurality of results represents a different type of result for the sample, and the multivariate machine learning model is trained using unsupervised machine learning.

In other features, processing the plurality of results via the multivariate machine learning model includes generating an input vector from the plurality of results and providing the input vector to the multivariate machine learning model to generate an output vector. In other features, the instructions further comprise generating the abnormal output for the plurality of results in response to an anomaly score computed based on a comparison of the input vector and the output vector exceeding a threshold value. In other features, the instructions further comprise setting the threshold value based on a training dataset. Setting the threshold value based on the training dataset includes loading a training dataset including training results for a plurality of training samples, inputting the training results to the multivariate machine learning model to generate training outputs, computing differences between the training results and the training outputs, and computing the threshold value based on the differences.

In other features, computing the threshold value based on the differences includes ordering the differences in ascending order, computing a first training value based on a lower percentile threshold of the ordered differences, computing a second training value based on an upper percentile threshold of the ordered differences, computing a first range based on a difference between the first training value and the second training value, and computing the threshold value as a function of the second training value and the first range. In other features, the multivariate machine learning model includes a neural network. In other features, the neural network includes an autoencoder. In other features, the neural network includes a variational autoencoder. In other features, the multivariate machine learning model is configured to identify anomalous features in the plurality of results. In other features, the instructions further comprise generating the abnormal output for the plurality of results in response to identifying anomalous features in the plurality of results. In other features, the multivariate machine learning model is an isolation forest model. In other features, the multivariate machine learning model is a local outlier factor model. In other features, the multivariate machine learning model is a one-class support vector machine.

In other features, the instructions further include training the univariate machine learning model. Training the univariate machine learning model includes loading a plurality of training results from the laboratory information management system, each result of the plurality of training results being the first type of result, ordering the plurality of training results in ascending order, computing a first observation value based on a lower percentile threshold of the ordered plurality of training results, computing a second observation value based on an upper percentile threshold of the ordered plurality of training results, computing a second range based on a difference between the first observation value and the second observation value, setting a minimum threshold as a function of the first observation value and the second range, and setting a maximum threshold as a function of the second observation value and the second range.

In other features, the instructions further comprise generating the normal output for the first result in response to determining the first result does not exceed the maximum threshold. In other features, the instructions further comprise generating the normal output for the first result in response to determining the first result is not below the minimum threshold. In other features, the instructions further comprise generating an abnormal output in response to determining the first result exceeds the maximum threshold or is below the minimum threshold. In other features, flagging the sample for rejection processing includes generating a notification on a graphical user interface. The notification includes at least one of (i) anomaly scores per feature, (ii) graphs, or (iii) graphical representations of clusters. In other features, flagging the sample for rejection processing includes flagging the sample for manual processing. In other features, flagging the sample for rejection processing includes adding, within the laboratory information management system, an anomaly tag to the first result and the second result.

A computer-implemented method includes processing a sample with a scientific instrument to generate a plurality of results, inputting at least one result of the plurality of results to a trained univariate machine learning model to generate a univariate output for each result, inputting the univariate outputs to a trained multivariate machine learning model to generate a multivariate output, computing an anomaly score between the univariate outputs input to the trained multivariate machine learning model and the multivariate output, and flagging, within a laboratory information management system, the sample for rejection processing in response to determining that the anomaly score exceeds a threshold.

In other features, the method includes generating an input vector based on the univariate outputs and providing the input vector to the trained multivariate machine learning model to generate the multivariate output. Computing the anomaly score between the univariate outputs input to the trained multivariate machine learning model and the multivariate output includes computing a distance between the input vector and the multivariate output. In other features, the method includes training a multivariate machine learning model. Training the multivariate machine learning model includes generating a training input vector based on a training sample retrieved from the laboratory information management system, providing the training input vector to the multivariate machine learning model to generate a training output vector, computing a distance between the training input vector and the training output vector, updating parameters of the multivariate machine learning model in response to determining that the distance exceeds a threshold, and saving the multivariate machine learning model configured with the updated parameters as the trained multivariate machine learning model.

In other features, training the multivariate machine learning model includes saving the multivariate machine learning model as the trained multivariate machine learning model in response to determining that the distance does not exceed the threshold. In other features, the trained multivariate machine learning model comprises a neural network. In other features, the neural network comprises an autoencoder. In other features, the method further includes training the univariate machine learning model. Training the univariate machine learning model includes loading a plurality of training results from the laboratory information management system, ordering the plurality of training results in ascending order, computing a first observation value based on a lower percentile threshold of the ordered plurality of training results, computing a second observation value based on an upper percentile threshold of the ordered plurality of training results, computing a range based on a difference between the first observation value and the second observation value, setting a minimum threshold as a function of the first observation value and the range, and setting a maximum threshold as a function of the second observation value and the range. Each result of the plurality of training results is a first type of result.

In other features, the lower percentile threshold is about a 25th percentile. In other features, the upper percentile threshold is about a 75th percentile. In other features, inputting the univariate outputs to a trained multivariate machine learning model includes loading a selected result from the sample, determining whether the selected result is within a range between the minimum threshold and the maximum threshold, and adding the selected result to an input vector for the trained multivariate machine learning model in response to determining that the selected result is within a range between the minimum threshold and the maximum threshold. The selected result is the first type of result.

In other features, one or more non-transitory computer-readable media include instructions thereon that, when executed by one or more processing devices of a scientific instrument support apparatus, cause the scientific instrument support apparatus to perform the method.

A scientific instrument support apparatus includes memory hardware configured to store instructions and processing hardware configured to execute the instructions. The instructions include processing a sample with a scientific instrument to generate a plurality of results, inputting at least one result of the plurality of results to a trained univariate machine learning model to generate a univariate output for each result, inputting the univariate outputs to a trained multivariate machine learning model to generate a multivariate output, computing an anomaly score between the univariate outputs input to the trained multivariate machine learning model and the multivariate output, and flagging, within a laboratory information management system, the sample for rejection processing in response to determining that the anomaly score exceeds a threshold.

In other features, the instructions further comprise generating an input vector based on the univariate outputs and providing the input vector to the trained multivariate machine learning model to generate the multivariate output. Computing the anomaly score between the univariate outputs input to the trained multivariate machine learning model and the multivariate output includes computing a distance between the input vector and the multivariate output. In other features, the instructions further comprise training a multivariate machine learning model. Training the multivariate machine learning model includes generating a training input vector based on a training sample retrieved from the laboratory information management system, providing the training input vector to the multivariate machine learning model to generate a training output vector, computing a distance between the training input vector and the training output vector, and updating parameters of the multivariate machine learning model and saving the multivariate machine learning model configured with the updated parameters as the trained multivariate machine learning model in response to determining that the distance exceeds a threshold.

In other features, training the multivariate machine learning model includes saving the multivariate machine learning model as the trained machine learning model in response to determining that the distance does not exceed the threshold. In other features, the trained multivariate machine learning model comprises a neural network. In other features, the neural network comprises an autoencoder. In other features, the instructions further comprise training the univariate machine learning model. Training the univariate machine learning model includes loading a plurality of training results from the laboratory information management system, ordering the plurality of training results in ascending order, computing a first observation value based on a lower percentile threshold of the ordered plurality of training results, computing a second observation value based on an upper percentile threshold of the ordered plurality of training results, computing a range based on a difference between the first observation value and the second observation value, setting a minimum threshold as a function of the first observation value and the range, and setting a maximum threshold as a function of the second observation value and the range. Each result of the plurality of training results being a first type of result.

In other features, the lower percentile threshold is about a 25th percentile. In other features, the upper percentile threshold is about a 75th percentile. In other features, inputting the univariate outputs to a trained multivariate machine learning model includes loading a selected result from the sample, determining whether the selected result is within a range between the minimum threshold and the maximum threshold, and adding the selected result to an input vector for the trained multivariate machine learning model in response to determining that the selected result is within a range between the minimum threshold and the maximum threshold. The selected result is the first type of result.

In other features, one or more non-transitory computer-readable media include instructions thereon that, when executed by one or more processing devices of a scientific instrument support apparatus, cause the scientific instrument support apparatus to perform the method.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
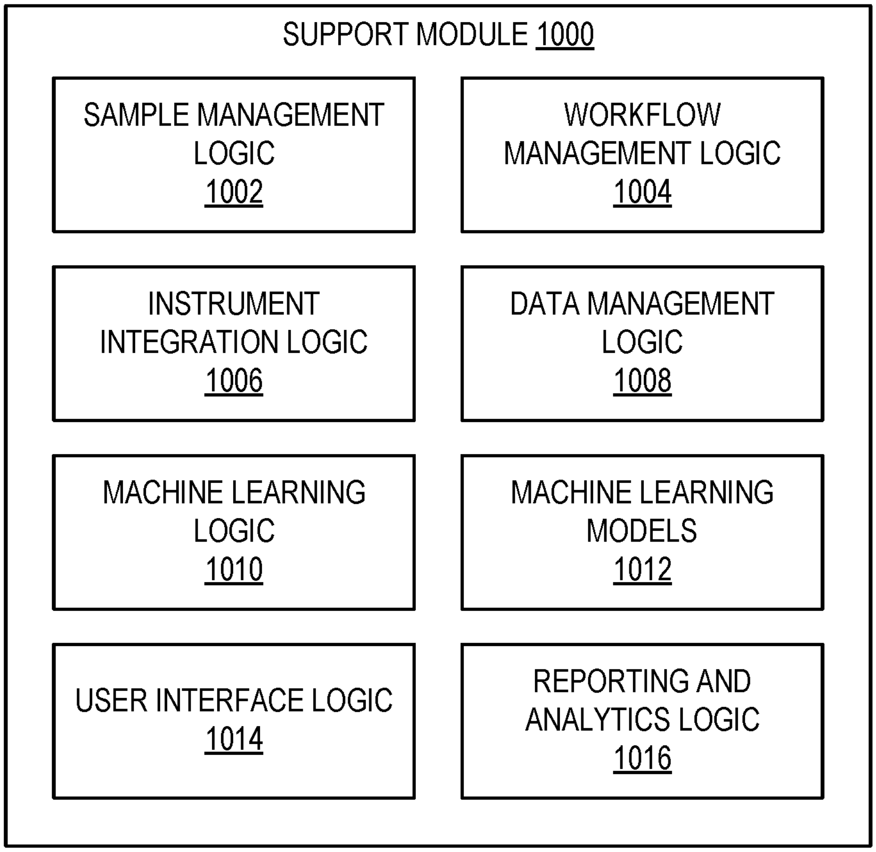
FIG. 1 is a block diagram of a scientific instrument support module for performing support operations.

Disclosed herein are scientific instrument support systems, as well as related methods, computing devices, and computer-readable media. For example, in some embodiments, a method of detecting sample anomalies within a laboratory information management system includes obtaining a first result for a sample within the laboratory information management system, processing the first result via a univariate machine learning model within the laboratory information management system, processing, within the laboratory information management system, a plurality of results for the sample via a multivariate machine learning model in response to the univariate machine learning model generating a normal output for the first result, and flagging, within the laboratory information management system, the sample for rejection processing in response to the multivariate machine learning model generating an abnormal output for the plurality of samples. The first result represents a first type of result, the univariate machine learning model is trained using unsupervised machine learning, the plurality of results includes the first result, each of the plurality of results represents a different type of result for the sample, and the multivariate machine learning model trained using unsupervised machine learning.

The embodiments disclosed herein thus provide improvements to scientific instrument technology (e.g., improvements in the computer technology supporting such scientific instruments, among other improvements). For example, techniques described in this specification do not rely on human operators to set rules (such as thresholds) for each variable in test data, which removes the variability introduced by relying on human expertise and improves the consistency of laboratory quality control processes. Additionally, by removing the need for and reliance on skilled human operators, techniques described in this specification allow for the implementation of fully automated sampling and analysis processes within the laboratory environment. Techniques described in this specification also do not require human operators to learn and adapt their analyses to new types of data and/or samples analyzed under different conditions. Instead, techniques described herein are capable of operating in an unsupervised manner. For example, techniques described herein are capable of automatically learning—for example, using historical scientific instrument test data—how to process and analyze new types of scientific instrument results generated from new sample types that are analyzed under new conditions, all without requiring human input or analysis.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

FIG. 1 is a block diagram of a scientific instrument support module 1000 for performing support operations, in accordance with various embodiments. The scientific instrument support module 1000 may be implemented by circuitry (e.g., including electrical and/or optical components), such as a programmed computing device. The logic of the scientific instrument support module 1000 may be included in a single computing device or may be distributed across multiple computing devices that are in communication with each other as appropriate. Examples of computing devices that may, singly or in combination, implement the scientific instrument support module 1000 are discussed herein with reference to the computing device 12000 of FIG. 12, and examples of systems of interconnected computing devices, in which the scientific instrument support module 1000 may be implemented across one or more of the computing devices, is discussed herein with reference to the scientific instrument support system 13000 of FIG. 13.

In various implementations, the scientific instrument support module 1000 may implement a software-based solution that manages the data and processes associated with operations of scientific instruments within a laboratory environment. For example, scientific instrument support module 1000 may implement a laboratory information management system. Accordingly, as shown in the example of FIG. 1, some examples of scientific instrument support module 1000 include sample management logic 1002, workflow management logic 1004, instrument integration logic 1006, data management logic 1008, machine learning logic 1010, one or more machine learning models 1012, user interface logic 1014, and/or reporting and analytics logic 1016. In various implementations, sample management logic 1002 organizes and tracks samples and data associated with samples throughout the lifecycle of each sample. For example, sample management logic 1002 assigns a unique identifier to each sample, maintains records of each sample's location, and stores data related to the sample (such as the origin of the sample, tests conducted on the sample, and results of the tests conducted on the sample).

In some embodiments, workflow management logic 1004 manages and automates the laboratory's processes and tasks. Workflow management logic 1004 automates the planning, execution, and monitoring of sequences of processes within the laboratory. For example, workflow management logic 1004 guides samples through each stage of the laboratory process—from reception, assignment, processing, and quality control to final approval. In some examples, instrument integration logic 1006 connects support module 1000 and the laboratory's scientific instruments and other equipment. Instrument integration logic 1006 may control scientific instruments and other machines in the laboratory and/or capture data produced by the scientific instruments and other machines. In example embodiments, data management logic 1008 captures, stores, and processes data generated from laboratory operations. Such data may include sample data, results from experiments or tests conducted on samples using scientific instruments, calibration data for instruments, and/or quality control data. In various implementations, data management logic 1008 performs data analysis and validation operations on the data generated from laboratory operations. For example, data management logic 1008 and machine learning logic 1010 perform multivariate anomaly detection on test data generated by scientific instruments.

In various implementations, machine learning logic 1010 trains machine learning models stored in machine learning models 1012. Machine learning models 1012 include one or more univariate machine learning models and one or more multivariate machine learning models. Examples of univariate machine learning models include machine learning models that implement outlier detection methods, such as the Interquartile Range (IQR) Method, the Z-score threshold method, and other suitable methods. Examples of multivariate machine learning models include neural networks (such as autoencoders and variational autoencoders), ensemble learning models such as the Isolation Forest model, density-based anomaly detection algorithms such as the Local Outlier Factor model, and/or the One-Class Support Vector Machine model. In some embodiments, user interface logic 1014 generates graphical user interfaces for users to interact with the laboratory information management system (such as graphical user interface 11000, which will be described further on in this specification with reference to FIG. 11). For example, the graphical user interface might include dashboards, forms buttons, menus, and other visualization to help users navigate and operate the laboratory information management system. In some implementations, reporting and analytics logic 1016 generates reports based on data stored in the laboratory information management system. For example, reporting and analytics logic 1016 generates reports ranging from summaries of test results to in-depth analysis of univariate and/or multivariate anomaly detection performed by data management logic 1008 and/or machine learning logic 1010. Additional functionality of logic and models of support module 1000 will be described further on in this specification with reference to the figures.

As used herein, the term "logic" may include an apparatus that is to perform a set of operations associated with the logic. For example, any of the logic elements included in the support module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

Figure 2:
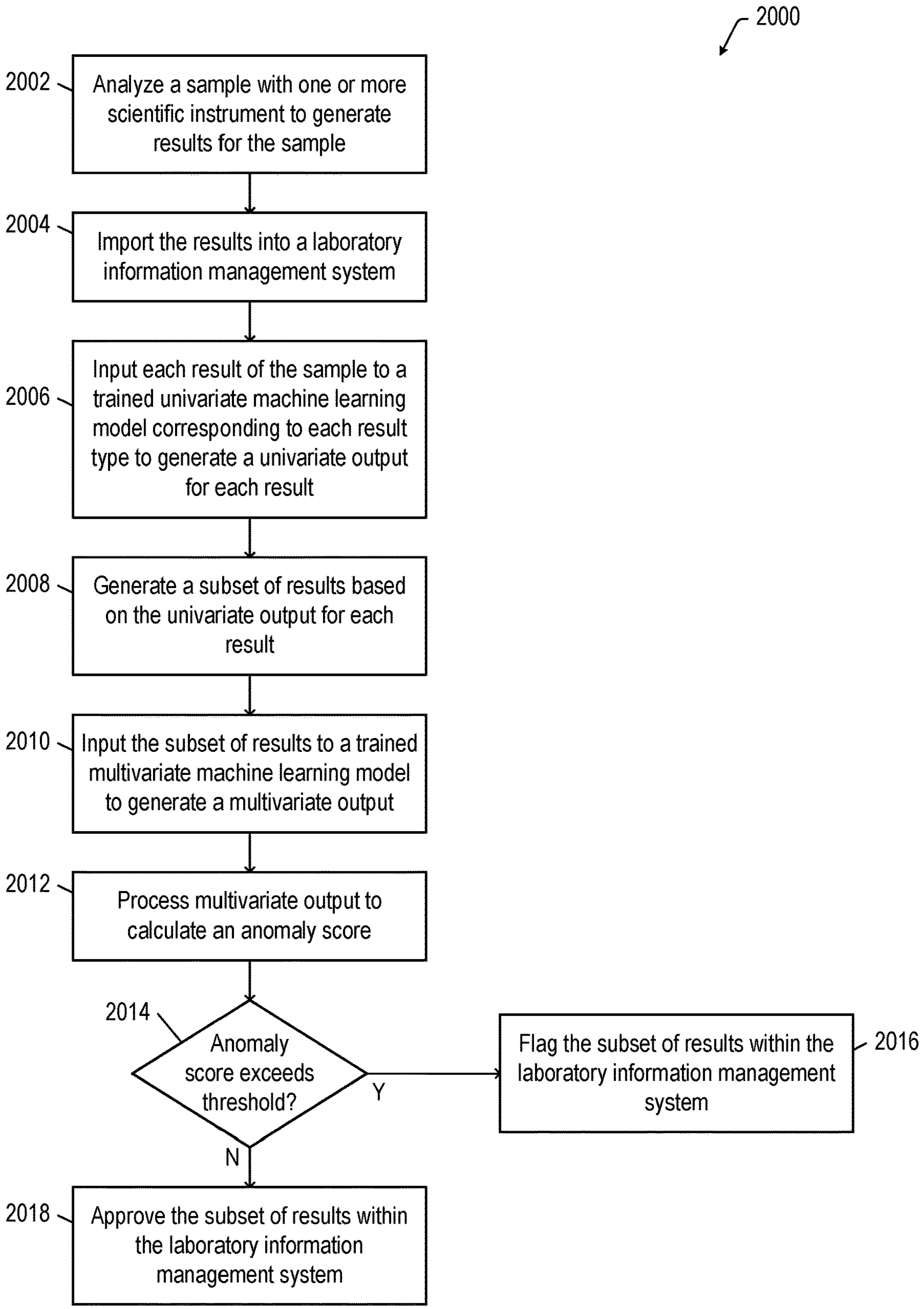
FIG. 2 is a flowchart of an example process for detecting multivariate anomalies within results generated by a scientific instrument.

FIG. 2 is a flowchart of an example process 2000 for detecting multivariate anomalies within results generated by a scientific instrument. At 2002, one or more scientific instruments analyze a sample to generate results for the sample. In various implementations, the one or more scientific instruments may perform qualitative analysis on the sample, and the results may identify components present in the sample (for example, elements in a chemical compound, species present in a biological sample, and/or phases present in a material sample). In some embodiments, the one or more scientific instruments perform quantitative analysis on the sample and identify amounts or concentrations of elements or compounds present in the sample (for example, a mass, a volume, and/or a number of particles of each identified component). In some examples, the one or more scientific instruments may perform structural analysis on the sample (for example, identifying a spatial arrangement of atoms in a crystal or an arrangement of cells in a tissue sample). In example embodiments, the one or more scientific instruments measure physical properties of the sample (such as temperature, pressure, electrical conductivity, magnetic properties, optical properties, and/or mechanical properties-such as hardness or tensile strength). In various implementations, the one or more scientific instruments measure chemical properties of the sample (such as pH, reactivity, and/or thermodynamic properties). In some embodiments, the one or more scientific instruments measure spectral properties of the sample. Examples of scientific instruments include mass spectrometers, electron microscopes, gas chromatographs, liquid chromatographs, inductively coiled plasma mass spectrometry instruments, Fourier-transform infrared spectrometers, nuclear magnetic resonance spectrometers, x-ray diffractometers, Raman spectrometers, thermocyclers, centrifuges, and/or flow cytometers. In various implementations, instrument integration logic 1006 controls the one or more scientific instruments and saves data generated by the one or more scientific instruments as results.

Each result may refer to a single data point associated with a single property of the sample generated by one or more scientific instruments. Accordingly, where the one or more scientific instruments generate test data including multiple data points associated with multiple properties of the sample, the one or more scientific instruments generate multiple results—one associated with each data point. Thus, the multiple results generated for the sample may include one or more data points for one or more properties of the sample. Results associated with a property may be collectively referred to as a type of result. At 2004, results generated by the one or more scientific instruments are imported into a laboratory information management system—such as the laboratory information management system implemented by support module 1000. For example, instrument integration logic 1006 passes the results to data management logic 1008 and data management logic 1008 saves the results to one or more data stores.

At 2006, data management logic 1008 and/or machine learning logic 1010 inputs each result of the sample to a trained univariate machine learning model corresponding to each result type to generate a univariate output for each result. For example, if the result is a pH measurement, then data management logic 1008 and/or machine learning logic 1010 selects a trained univariate machine learning model for pH and inputs the pH measurement into the selected trained univariate machine learning model to generate a univariate output for the sample. In various implementations, each univariate machine learning model may be trained to predict whether a single result or a single type of result is likely to be univariate anomalous, and the univariate output indicates whether or not the result input into the univariate machine learning model is likely to be univariate anomalous. Data management logic 1008 labels each result with whether it is likely to be univariate anomalous according to the output of the univariate machine learning model. In various implementations, reporting and analytics logic 1016 generates a report related to each result input into the univariate machine learning model. For example, the report includes a visual representation of the result along with a distribution of other results of the same type. The visual representation may be as a density plot, box plot, dot plot, and/or a time-series plot. The report may also include summary statistics of the result input into the univariate machine learning model and other results of the same type. Example summary statistics include a mean, median, minimum, maximum, first quartile value, third quartile value, standard deviation, and/or mean absolute deviation. The report may be output to the graphical user interface. In various implementations, the report include interactive portions, such as an interactive dashboard. Additional details associated with training the univariate machine learning models will be described further on in this specification with reference to FIG. 3 and additional details associated with predicting whether a result is likely to be univariate anomalous will be described further on in this specification with reference to FIG. 4.

At 2008, data management logic 1008 generates a subset of results based on the univariate output for each result. In various implementations, data management logic 1008 adds each result labeled as not likely to be univariate anomalous to the subset of results. At 2010, data management logic 1008 and/or machine learning logic 1010 inputs the subset of results to a trained multivariate machine learning model to generate a multivariate output. In some embodiments, the subset of results are first preprocessed using the same preprocessing techniques used during training of the multivariate machine learning model and the preprocessed results are saved to an input vector. In some embodiments, preprocessing may include techniques such as normalization, standardization, imputation, and/or variable encoding. The input vector is provided to the trained multivariate machine learning model as input data. In various implementations, the trained multivariate machine learning model generates an efficient (or compressed) representation of the input data by mapping the input data to a lower-dimensional representation. The trained multivariate machine learning model then reconstructs the lower-dimensional representation back into a higher-dimensional representation (for example, matching the dimensionality of the input data) as multivariate outputs. Additional details associated with training the multivariate machine learning models will be described further in this specification with reference to FIGS. 5A-5B and additional details associated with example multivariate machine learning models will be described further on in this specification with reference to FIGS. 8-9.

At 2012, data management logic 1008 processes the multivariate output to calculate an anomaly score-such as an error or a reconstruction error. In various implementations, data management logic 1008 calculates a difference between the input and output of the multivariate machine learning model and returns the calculated difference as the anomaly score. The anomaly score may include a difference between each feature input into the multivariate machine learning model and a corresponding component of the output. In some embodiments, the anomaly score may include an aggregate difference between all features input into the multivariate machine learning model and all components of the output. Additional details associated with calculating the anomaly score will be described further on in this specification with reference to FIG. 6. In various implementations, reporting and analytics logic 1016 generates a report including the anomaly score associated with each result. In some embodiments, the report includes a visual representation of the anomaly scores associated with each result. The visual representation may be a distribution of the anomaly scores—for example, a density plot, box plot, dot plot, and/or time-series plot of the anomaly scores. In some examples, reporting and analytics logic 1016 clusters the anomaly scores using a clustering algorithm such as the k-means algorithm (the value of k may be automatically determined or manually set by the user). The clusters may be presented as a two-dimensional visualization using dimensionality reduction techniques. In some embodiments, results and anomaly score statistics and their graphical representation may be aggregated and presented by clusters.

At 2014, data management logic 1008 compares the anomaly score to a threshold and determines whether the anomaly score exceeds the threshold. Additional details associated with automatically calculating the threshold will be described further on in this specification with reference to FIGS. 7A-7B. In response to determining that the anomaly score exceeds the threshold ("YES" at decision block 2014), data management logic 1008 flags the subset of results, the results for the sample, and/or the sample for rejection processing at 2016. In various implementations, data management logic 1008 adds an anomaly tag to the results and/or the sample. In some examples, reporting and analytics logic 1016 generates a graphical user interface notification alerting the user that the results and/or the sample are potentially anomalous. In some embodiments, reporting and analytics logic 1016 may generate a graphical user interface prompt for the user to perform manual inspection on the results and/or the sample. In response to determining that the anomaly score does not exceed the threshold ("NO" at decision block 2014), data management logic 1008 approves the subset of results, the results, and/or the sample as being non-anomalous at 2018.

While process 2000 is described with results being generated by one or more scientific instruments at 2002 and saved to a laboratory information management system at 2004, in some implementations, results may be generated by any suitable data source at 2002 and saved to any suitable data store and/or data management system at 2004. Accordingly, the subset of results, the results, and/or the sample may be flagged in any suitable data management system at 2016 and/or approved in any suitable data management system at 2018.

Furthermore, in some embodiments, one or more of the results are not provided to corresponding trained univariate machine learning model at 2006. These results may also be added to the subset of results at 2008. In some examples, the subset of results may include all results, regardless of whether they have been processed through a trained univariate machine learning model at 2006.

Figure 3:
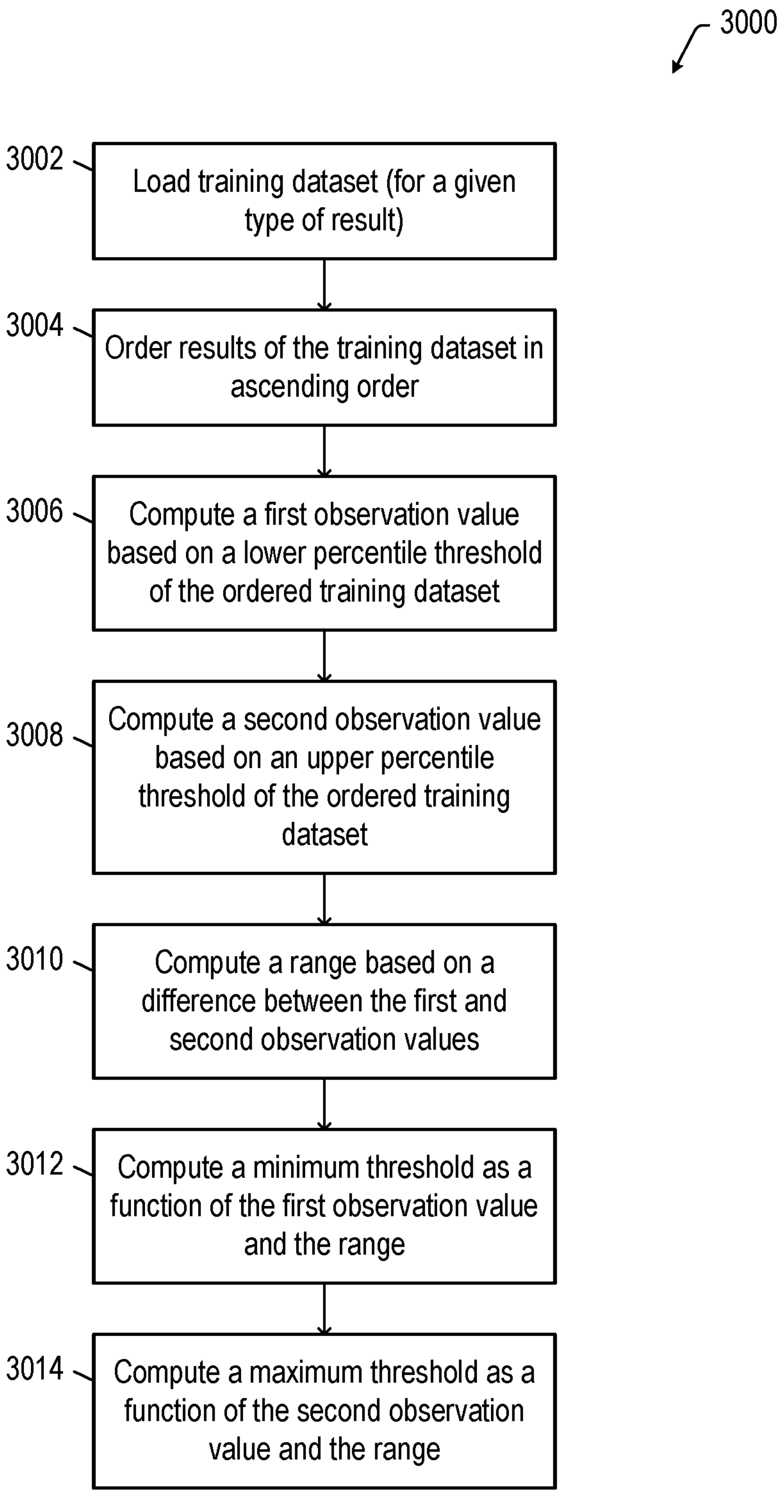
FIG. 3 is a flowchart of an example process for training a univariate machine learning model.

FIG. 3 is a flowchart of an example process 3000 for training a univariate machine learning model. At 3002, machine learning logic 1010 loads a training dataset. Each element of the training dataset may be a same type of result for one or more samples. In some embodiments, the results of the training dataset follow a substantially normal distribution. At 3004, machine learning logic 1010 orders results of the training dataset in ascending order. At 3006, machine learning logic 1010 computes a first observation value based on a lower percentile threshold of the ordered training dataset. For example, machine learning logic 1010 computes the value below which a given percentage of observations in the results fall and sets the value as the first observation value. In various implementations, the first observation value is the value below which about 25% of the results fall in the ordered training dataset. At 3008, machine learning logic 1010 computes a second observation value based on an upper percentile threshold of the ordered training dataset. For example, machine learning logic 1010 computes the value below which a given percentage of observations in the results fall and sets the value as the second observation value. In some embodiments, the second observation value is the value below which about 75% of the results fall in the ordered training dataset.

At 3010, machine learning logic 1010 computes a range based on a difference between the first and second observation values. In various implementations, the range is computed by subtracting the first observation value from the second observation value, equation (1) below:

$$\text{range} = \text{second observation value} - \text{first observation value} \quad (1)$$

At 3012, machine learning logic 1010 computes a minimum threshold as a function of the first observation value and the range. For example, the minimum threshold is computed according to equation (2) below:

$$\text{minimum threshold} = \text{first observation value} - a \cdot \text{range} \quad (2)$$

At 3014, machine learning logic 1010 computes a maximum threshold as a function of the second observation and the range. For example, the maximum threshold is computed according to equation (3) below:

$$\text{maximum threshold} = \text{second observation value} + b \cdot \text{range} \quad (3)$$

In equations (1) and (2), a and b may be pre-defined or user-defined constants or range multipliers. In various implementations, a and/or b may be about 1.5. Accordingly, the minimum threshold and maximum threshold are set for the type of result corresponding to the training dataset. Process 3000 may be repeated with training datasets corresponding to each type of result so that a univariate machine learning model is trained for each type of result. In various implementations, process 3000 may be repeated when new training datasets become available.

Figure 4:
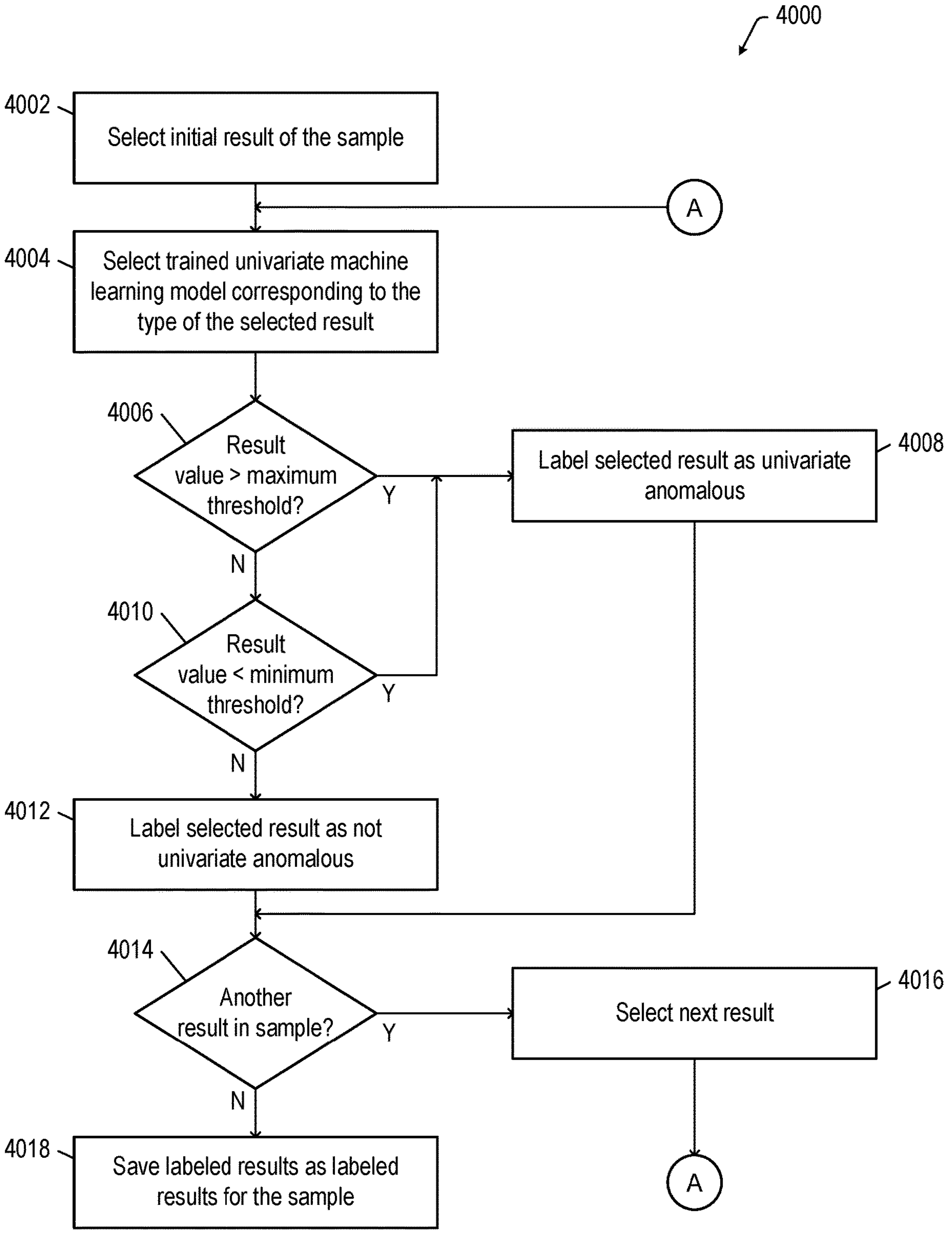
FIG. 4 is a flowchart of an example process for analyzing one or more results using a trained univariate machine learning model.

FIG. 4 is a flowchart of an example process 4000 for analyzing one or more results using a trained univariate machine learning model. At 4002, machine learning logic 1010 selects an initial result corresponding to a sample. At 4004, machine learning logic 1010 selects a trained univariate machine learning model corresponding to the type of the selected result. At 4006, machine learning logic 1010 determines whether the value of the selected result exceeds the maximum threshold. In response to machine learning logic 1010 determining that the value of the selected result exceeds the maximum threshold ("YES" at decision block 4006), data management logic 1008 and/or machine learning logic 1010 labels the selected result as univariate anomalous at 4008 and proceeds to decision block 4014. In response to machine learning logic 10101 determining that the value of the selected result does not exceed the maximum threshold ("NO" at decision block 4006), machine learning logic 1010 determines whether the value of the selected result is below the minimum threshold at decision block 4010.

In response to machine learning logic 1010 determining that the value of the selected result is below the minimum threshold ("YES" at decision block 4010), data management logic 1008 and/or machine learning logic 1010 labels the selected result as univariate anomalous at 4008 and proceeds to decision block 4014. In response to machine learning logic 1010 determining that the value of the selected result is not below the minimum threshold ("NO" at decision block 4010), data management logic 1008 and/or machine learning logic 1010 labels the selected result as not univariate anomalous at 4012 and proceeds to decision block 4014. At decision block 4014, machine learning logic 1010 determines whether another unlabeled result is present in the set of results corresponding to the sample. In response to determining another unlabeled result is present ("YES" at decision block 4014), machine learning logic 1010 selects the next unlabeled result at 4016 and proceeds back to block 4004. In response to machine learning logic 1010 determining all results corresponding to the sample have been labeled ("NO" at decision block 4014), data management logic 1008 and/or machine learning logic 1010 saves the labeled results as labeled results for the sample at 4018.

Figure 5A:
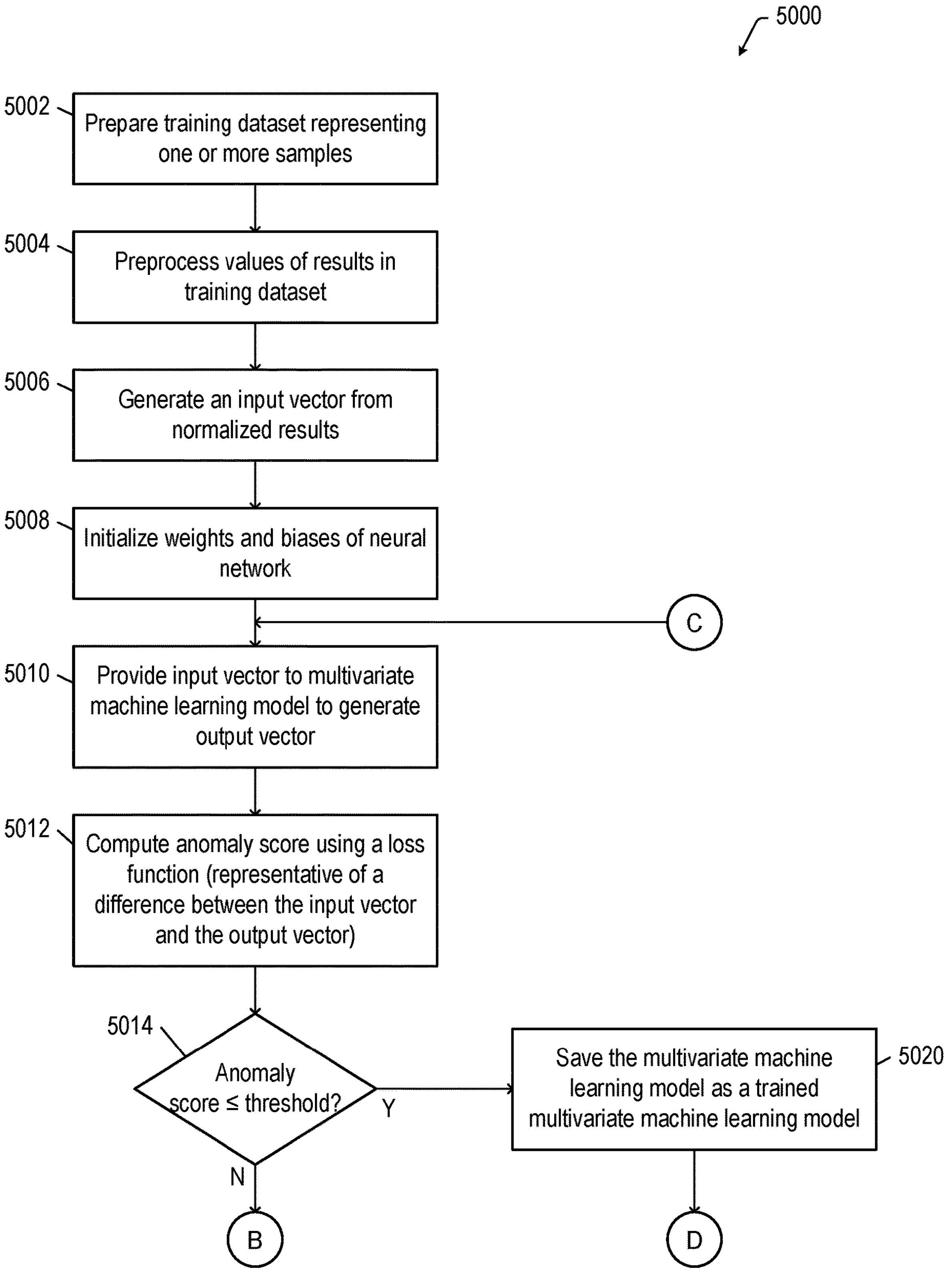
FIGS. 5A-5B are flowcharts of an example process for training a multivariate machine learning model.
Figure 5B:
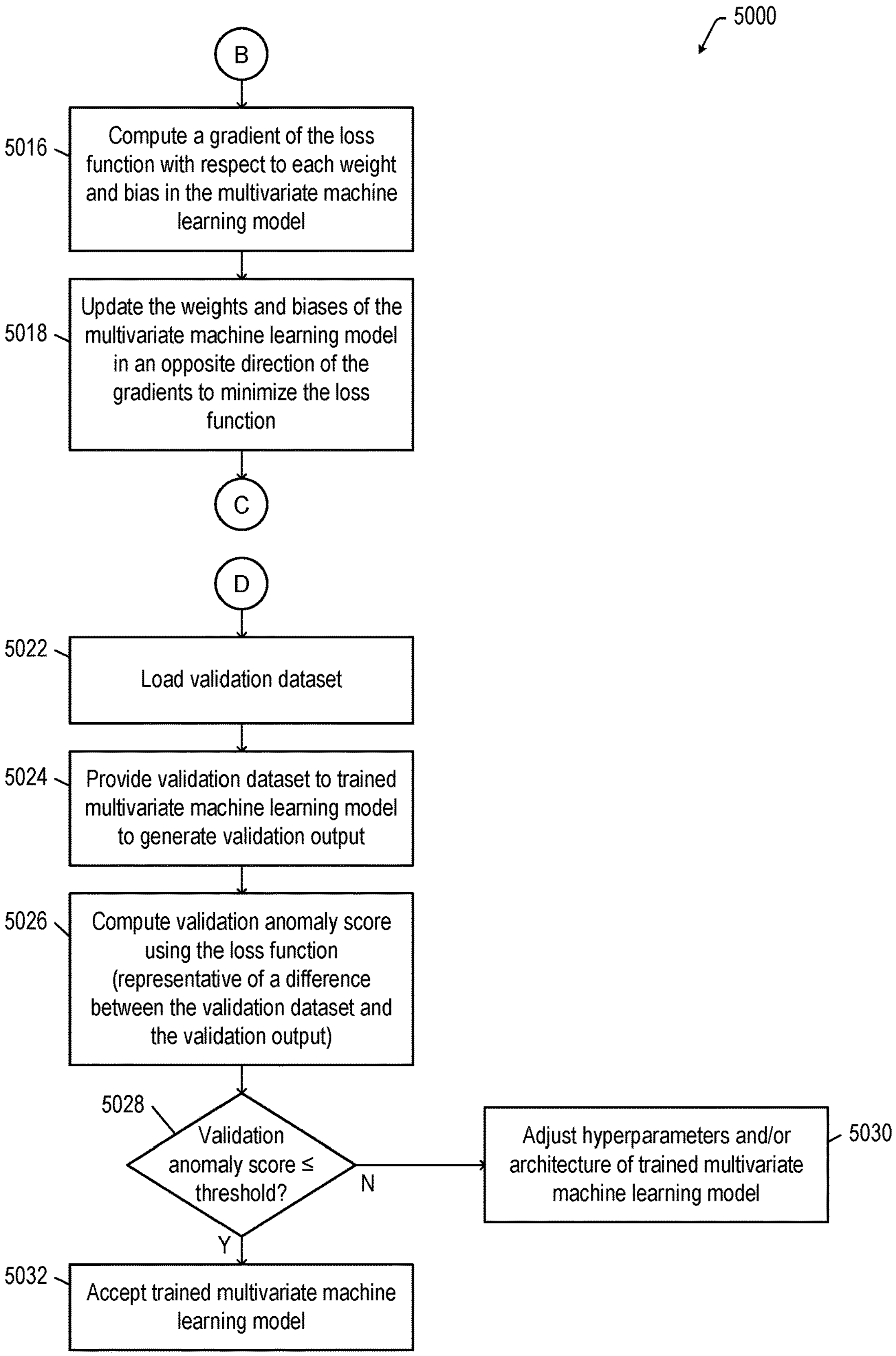

FIGS. 5A-5B are flowcharts of an example process 5000 for training a multivariate machine learning model. At 5002, machine learning logic 1010 prepares a training dataset representing more than one sample. In some examples, the user may exclude known-anomalous samples from the training dataset. In various implementations, the training dataset includes one or more sets of results with each set corresponding to a sample. At 5004, machine learning logic 1010 preprocesses values of results in the training dataset (for example, according to standardization, feature encoding, imputation, and/or other suitable techniques). In some implementations, each original value x may be standardized to a new value x' according to equation (4) below—where $x_{min}$ is the minimum value in the epoch or dataset and $x_{max}$ is the maximum value in the epoch or dataset:

$$x' = 2 \cdot \frac{x - x_{min}}{x_{max} - x_{min}} - 1 \quad (4)$$

In various embodiments, each original value x may be standardized to a new value x' according to equation (5) below—where μ is the mean of the epoch or dataset and σ is the standard deviation of the epoch or dataset:

$$x' = \frac{x - \mu}{\sigma} \quad (5)$$

In various implementations, the training dataset and dataset representing the sample being evaluated by the multivariate machine learning model are preprocessed using the same method and/or values calculated during the training phase. At 5006, machine learning logic 1010 generates an input vector from the preprocessed results. For example, the input vector may include preprocessed results from a set (e.g., representing a sample). At 5010, machine learning logic 1010 provides the input vector to the multivariate machine learning model to generate an output vector. At 5012, machine learning logic 1010 computes an anomaly score—such as a reconstruction error em using a loss function. In some embodiments, the reconstruction error represents a difference between the input vector and the output vector. Additional details associated with computing the anomaly score will be described further on in this specification with reference to FIG. 6. At 5014, machine learning logic 1010 determines whether the anomaly score is less than or equal to a threshold. In some embodiments, different combinations of hyperparameters—such as the threshold—may be tested during validation, and the set of hyperparameters with the smallest validation reconstruction error may be selected. Furthermore, an inspection of the validation results may determine whether a model configured with the set of hyperparameters is ready for use. In various implementations, the inspection may be performed according to a threshold, distribution of errors, error metrics, or subjective methodologies. According to some embodiments, the multivariate machine learning model may be trained according to supervised or semi-supervised techniques, and the validation results may be compared with an actual label of the training samples (to avoid overfitting or validation).

Figure 7A:
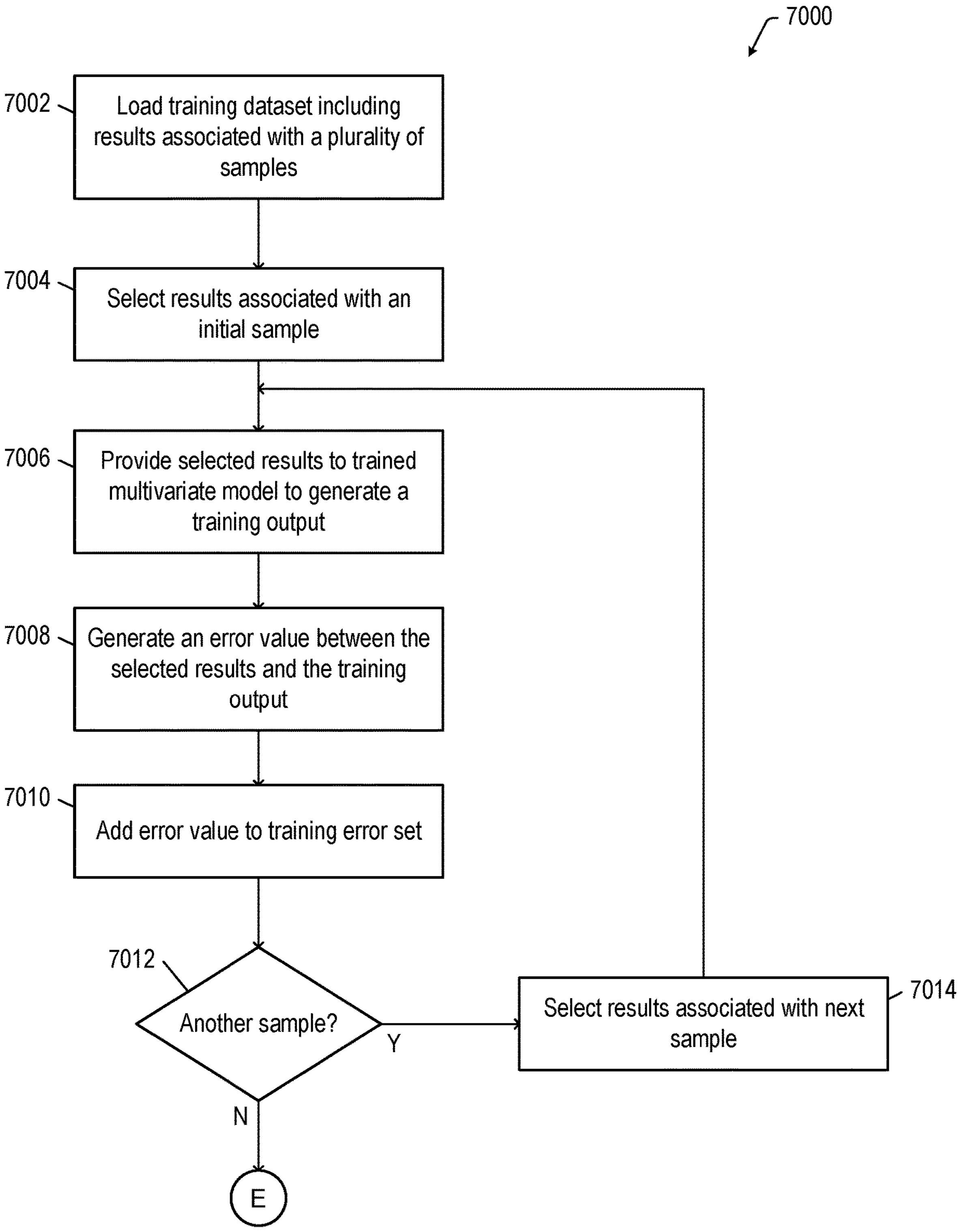
FIGS. 7A-7B are flowcharts of an example process for automatically computing an anomaly score threshold for a multivariate machine learning model.
Figure 7B:
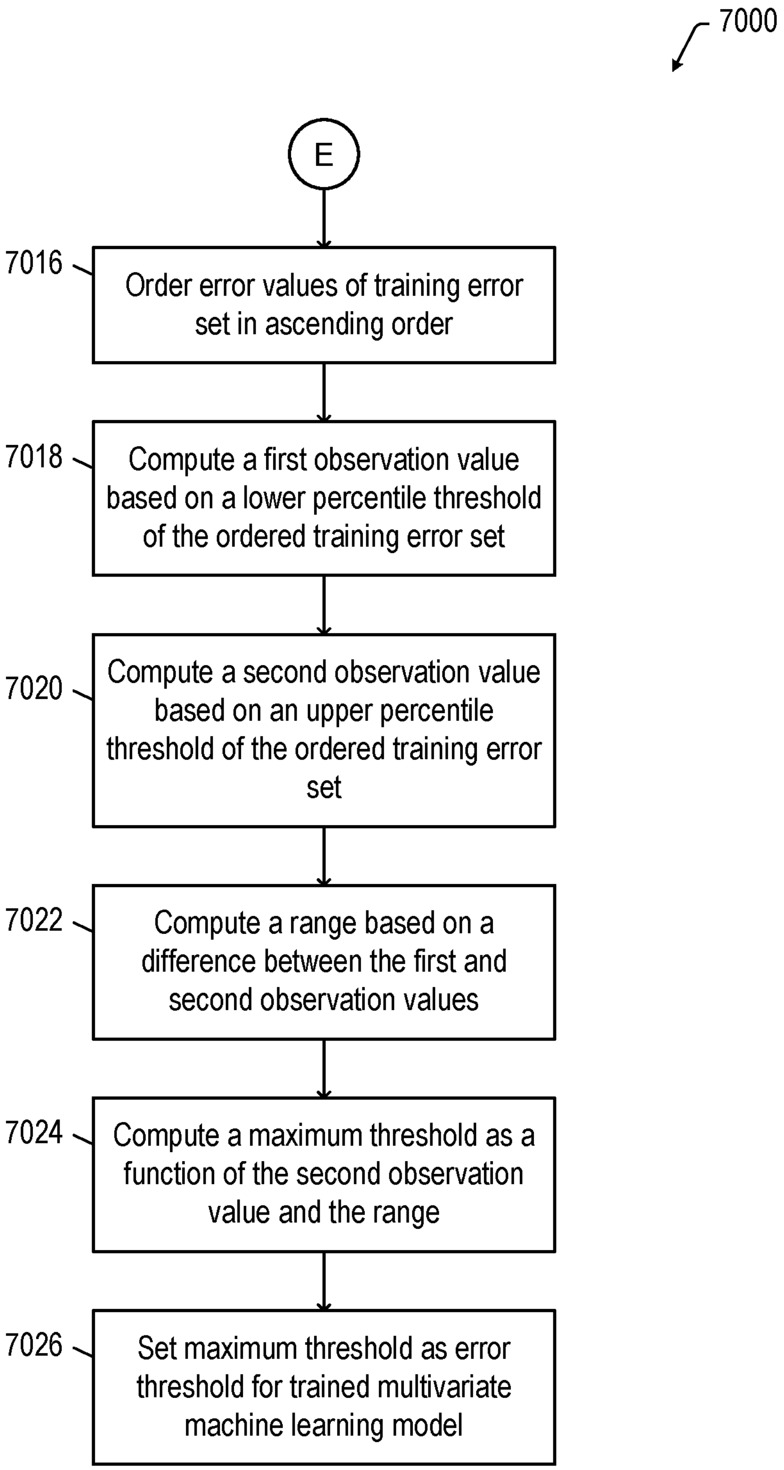

In some examples, the threshold may be automatically determined according to techniques described further on in this specification with reference to FIGS. 7A-7B. In response to determining that the anomaly score is not less than or equal to the threshold ("NO" at decision block 5014), machine learning logic 1010 computes a gradient of the loss function with respect to each weight and bias in the multivariate machine learning model at 5016. At 5018, machine learning logic 1010 updates the weights and biases of the multivariate machine learning model in an opposite direction of the gradients to minimize the loss function and process 5000 returns to block 5010.

In response to machine learning logic 1010 determining that the anomaly score is less than or equal to the threshold ("YES" at decision block 5014), machine learning logic 1010 saves the multivariate machine learning model as a trained multivariate machine learning model at 5020. For example, machine learning logic 1010 saves trained multivariate machine learning model to trained machine learning models 1012. At 5022, machine learning logic 1010 loads a validation dataset. In various implementations, validation dataset includes results corresponding to a sample not present in the training dataset. In some embodiments, the validation dataset is pre-processed using the same methods as used for the training dataset. At 5024, machine learning logic 1010 provides the validation dataset to the trained machine learning model to generate a validation output. At 5026, machine learning logic 1010 computes a validation anomaly score using the loss function. The validation anomaly score may be representative of a difference between the validation dataset input into the trained multivariate machine learning model and the validation output. In various implementations, the validation anomaly score is calculated according to the same techniques as used to compute the anomaly score at block 5012. At 5028, machine learning logic 1010 determines whether the anomaly score is less than or equal to the threshold.

In response to determining that the anomaly score is not less than or equal to the threshold ("NO" at decision block 5028), machine learning logic 1010 adjusts hyperparameters and/or the architecture of the trained multivariate machine learning model (because the trained multivariate machine learning model may be overfitted to the training data) at 5030. Examples of hyperparameters include: (i) ρ (coefficient used for computing a running average of squared gradients) in implementations where the Adadelta optimization algorithm is used, (ii) the strength of regularization techniques used (such as L1 or L2) to prevent overfitting, and/or (iii) a number of nodes in the encoder and decoder layers. In response to determining that the anomaly score is less than or equal to the threshold ("YES" at decision block 5032), machine learning logic 1010 accepts the trained multivariate machine learning model at 5032.

Figure 6:
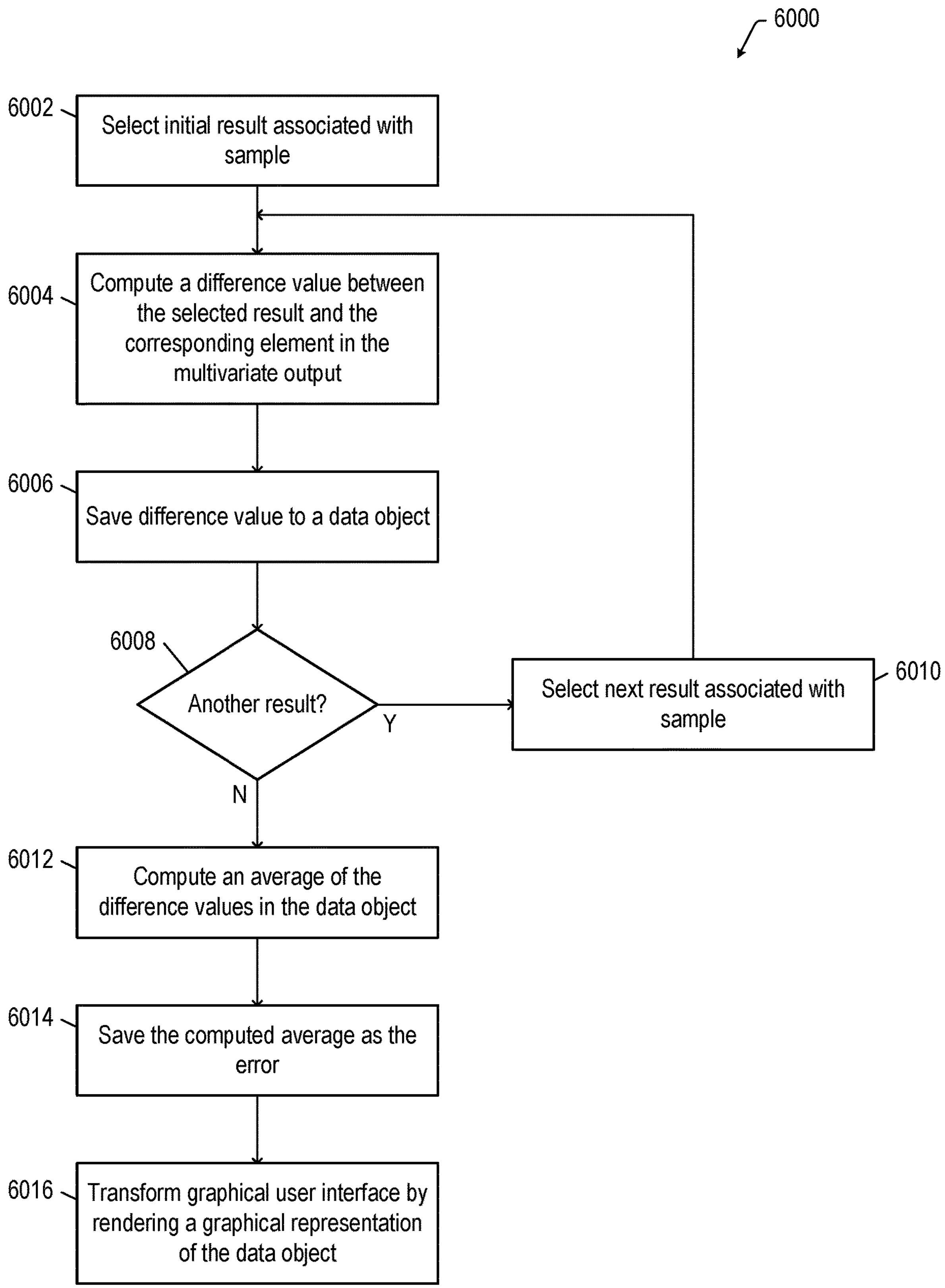
FIG. 6 is a flowchart of an example process for computing an anomaly score based on inputs and outputs of a multivariate machine learning model.

FIG. 6 is a flowchart of an example process 6000 for computing an anomaly score based on inputs and outputs of a multivariate machine learning model. At 6002, machine learning logic 1010 selects an initial result associated with a sample. In some examples, the results associated with the sample are preprocessed according to the same method used to train the multivariate machine learning model and vectorized so as to be suitable for input to a neural network. Accordingly, selecting the initial result may include selecting the initial element of the input vector. At 6004, machine learning logic 1010 computes a difference value between the selected result and the corresponding element in the multivariate output. For example, machine learning logic 1010 computes the difference value between the element in the input vector corresponding to the selected results and the corresponding element in the output vector generated by the multivariate machine learning model. At 6006, machine learning logic 1010 saves the difference value to a data object.

At 6008, machine learning logic 1010 determines whether another result associated with the sample is present that has not yet been processed. In response to determining that another result is present ("YES" at decision block 6008), machine learning logic 1010 selects the next result associated with the sample at 6010 and process 6000 proceeds back to block 6004. In response to determining that all results associated with the sample have been processed ("NO" at decision block 6008), machine learning logic 1010 computes an average of the difference values in the data object at 6012. While FIG. 6 shows difference values as being calculated sequentially for each result, difference values for the samples may be calculated substantially in parallel and sent substantially simultaneously to the data object before the average of the difference values in the data object is calculated at 6012. In some embodiments, machine learning logic 1010 first squares each difference value in the data object and then computes the average of the squared difference values. In various implementations, machine learning logic 1010 calculates a mean squared error, a root mean squared error, a mean absolute error, and/or other difference values. At 6014, machine learning logic 1010 saves the computed aggregated error as the error for the sample. In various implementations, the computed aggregate error includes independent reconstruction errors. At 6010, reporting and analytics logic 1016 generates a report including a graphical representation of the data object and transforms the graphical user interface to display the report.

FIGS. 7A-7B are flowcharts of an example process 7000 for automatically computing an anomaly score threshold for a multivariate machine learning model. At 7002, machine learning logic 1010 loads a training dataset include results associated with a plurality of samples. In some embodiments, the results are normalized according to the same techniques used during training of the multivariate machine learning model and each set of results associated with a sample are vectorized into an input vector associated with the sample. At 7004, machine learning logic 1010 selects results associated with an initial sample. For example, machine learning logic 1010 selects an input vector associated with the initial sample. At 7006, machine learning logic 1010 provides the selected results to a trained multivariate model to generate a training output.

At 7008, machine learning logic 1010 generates an error value between the selected results and the training output. In various implementations, machine learning logic 1010 computes the error value according to techniques previously discussed with reference to FIG. 6. At 7010, machine learning logic 1010 adds the error value to a training error set. At 7012, machine learning logic 1010 determines whether the training dataset includes results associated with another sample that has not yet been processed. In response to determining that results for an unprocessed sample are present in the training dataset ("YES" at decision block 7012), machine learning logic 1010 selects results associated with the next sample at 7014. For example, machine learning logic 1010 selects an input vector associated with the next sample. Process 7000 proceeds back to block 7006. In response to determining that results associated with all samples in the training dataset have been processed ("NO" at decision block 7012), machine learning logic 1010 orders error values of the training error set in ascending order at 7016.

At 7018, machine learning logic 1010 computes a first observation value based on a lower percentile threshold of the ordered training dataset. For example, machine learning logic 1010 computes the value below which a given percentage of observations in the ordered training error set fall and sets the value as the first observation value. In various implementations, the first observation value is the value below which about 25% of the observations fall. At 7020, machine learning logic 1010 computes a second observation value based on an upper percentile threshold of the ordered training error set. For example, machine learning logic 1010 computes the value below which a given percentage of observations in the results fall and sets the value as the second observation value. In some embodiments, the second observation value is the value below which about 75% of the results fall.

At 7022, machine learning logic 1010 computes a range based on a difference between the first and second observation values. In various implementations, the range is computed by subtracting the first observation value from the second observation value, equation (6) below:

$$\text{range} = \text{second observation value} - \text{first observation value} \tag{6}$$

At 7024, machine learning logic 1010 computes a maximum threshold as a function of the second observation and the range. For example, the maximum threshold is computed according to equation (7) below:

$$\text{maximum threshold} = \text{second observation value} + a \cdot \text{range} \tag{7}$$

In equation (7), a may be a pre-defined or user-defined constant or range multiplier. In various implementations, a may be about 1.5. At 7026, machine learning logic 1010 sets the maximum threshold as the anomaly value threshold for the trained multivariate machine learning model. For example, the anomaly value threshold set at block 7026 may be the anomaly value threshold used at decision block 2014 of process 2000 and/or decision blocks 5014 and/or 5028 of process 5000.

Figure 8:
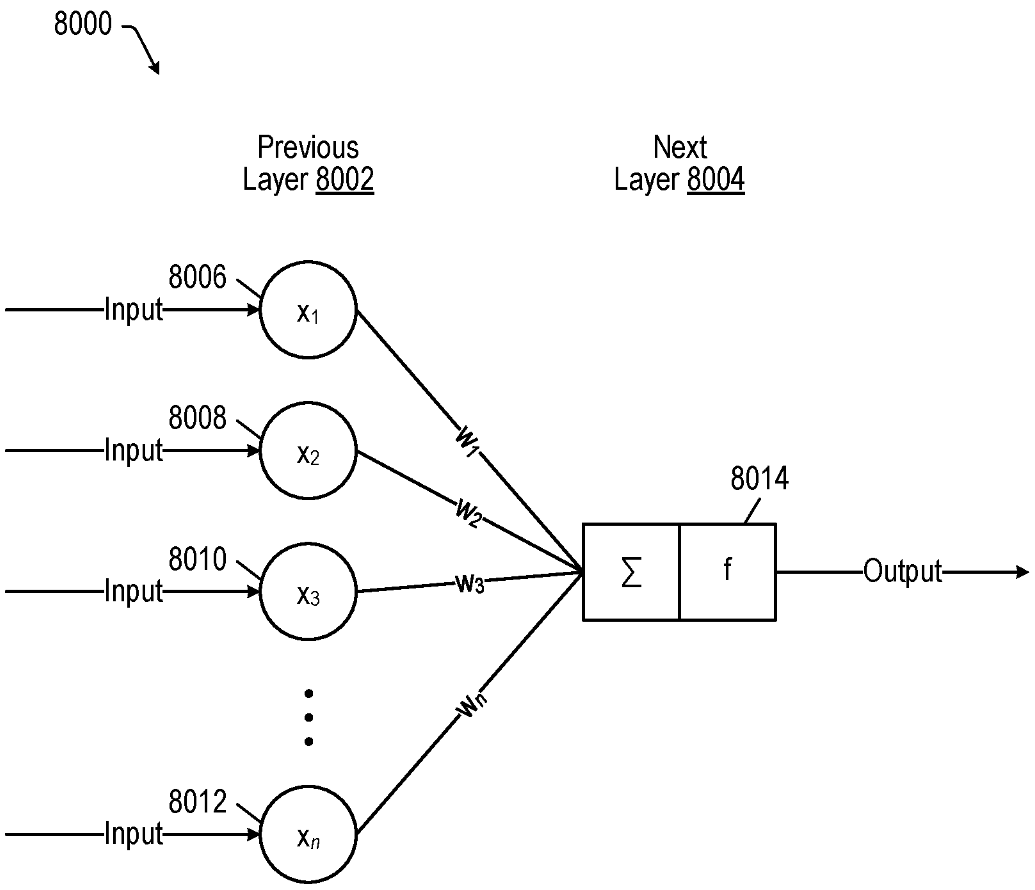
FIG. 8 is a graphical representation of a portion of an example neural network suitable for implementing a multivariate machine learning model.

FIG. 8 is a graphical representation of a portion of an example neural network suitable for implementing the multivariate machine learning model. Generally, neural networks may include an input layer, an output layer, and any number—including none—of hidden layers between the input layer and the output layer. Each layer of the machine learning model may include one or more nodes with each node representing a scalar. Input variables may be provided to the input layer. Any hidden layers and/or the output layer may transform the inputs into output variables, which may then be output from the neural network at the output layer. In various implementations, the input variables to the neural network may be an input vector having dimensions equal to the number of nodes in the input layer. In various implementations, the output variables of the neural network may be an output vector having dimensions equal to the number of nodes in the output layer.

Generally, the number of hidden layers—and the number of nodes in each layer—may be selected based on the complexity of the input data, time complexity requirements, and accuracy requirements. Time complexity may refer to an amount of time required for the neural network to learn a problem—which can be represented by the input variables—and produce acceptable results—which can be represented by the output variables. Accuracy may refer to how close the results represented by the output variables are to real results. In various implementations, increasing the number of hidden layers and/or increasing the number of nodes in each layer may increase the accuracy of neural networks but also increase the time complexity. Conversely, in various implementations, decreasing the number of hidden layers and/or decreasing the number of nodes in each layer may decrease the accuracy of neural networks but also decrease the time complexity.

As shown in FIG. 8, the neural network 8000 may include an input layer—such as previous layer 8002, an output layer—such as next layer 8004. Data may flow forward in neural network 8000 from previous layer 8002 to the next layer 8004, and the neural network 8000 may be referred to as a feedforward neural network. In various implementations, previous layer 8002 may include one or more nodes, such as nodes 8006-8012. Although only four nodes are shown in FIG. 8, previous layer 8002 may include any number of nodes, such as n nodes. In various implementations, each node of previous layer 8002 may be assigned any numerical value. For example, node 8006 may be assigned a scalar represented by $x_1$, node 8008 may be assigned a scalar represented by $x_2$, node 8010 may be assigned a scalar represented by $x_3$, and node 8012 may be assigned a scalar represented by $x_n$.

In various implementations, if previous layer 8002 is the input layer of neural network 8000, each of the nodes 8006-8012 may correspond to an element of the input vector. For example, the input variables to a neural network may be expressed as input vector i having n dimensions. So for neural network 8000—which has an input layer with nodes 8006-8012 assigned scalar values $x_1$-$x_n$, respectively—input vector i may be represented by equation (8) below:

$$i = \langle x_1, x_2, x_3, \ldots x_n \rangle \tag{8}$$

In various implementations, input vector i may be a signed vector, and each element may be a scalar value in a range of between about −1 and about 1. So, in some examples, the ranges of the scalar values of nodes 8006-8012 may be expressed in interval notation as: $x_1 \in [-1,1]$, $x_2 \in [-1,1]$, $x_3 \in [-1,1]$, and $x_n \in [-1,1]$.

Each of the nodes of a previous layer of a feedforward neural network—such as neural network 8000—may be multiplied by a weight before being fed into one or more nodes of a next layer. For example, the nodes of previous layer 8002 may be multiplied by weights before being fed into one or more nodes of the next layer 8004. In various implementations, next layer 8004 may include one or more nodes, such as node 8014. While only a single node is shown in FIG. 8, the next layer 8004 may have any number of nodes. In the example of FIG. 8, node 8006 may be multiplied by a weight $w_1$ before being fed into node 8014, node 8008 may be multiplied by a weight $w_2$ before being fed into node 8014, node 8010 may be multiplied by a weight $w_3$ before being fed into node 8014, and node 8012 may be multiplied by a weight $w_n$ before being fed into node 8014. At each node—such as node 8014—of the next layer, the inputs from the previous layer may be summed, and a bias may be added to the sum before the summation is fed into an activation function. The output of the activation function may be the output of the node.

In various implementations—such as in the example of FIG. 8, the summation of inputs from the previous layer may be represented by Σ. In various implementations, if a bias is not added to the summed outputs of the previous layer, then the summation Σ may be represented by equation (9) below:

$$\sum = x_1w_1 + x_2w_2 + x_3w_3 + \ldots\ x_nw_n \tag{9}$$

In various implementations, if a bias b is added to the summed outputs of the previous layer, then summation Σ may be represented by equation (10) below:

$$\sum = x_1w_1 + x_2w_2 + x_3w_3 + x_nw_n + b \tag{10}$$

The summation Σ may then be fed into activation function $f$. In various implementations, the activation function $f$ may be any mathematical function suitable for calculating an output of the node. Example activation functions $f$ may include linear or non-linear functions, step functions such as the Heaviside step function, derivative or differential functions, monotonic functions, sigmoid or logistic activation functions, rectified linear unit (ReLU) functions, and/or leaky ReLU functions. In some embodiments, the activation function may be the tanh function. The output of the function $f$ may then be the output of the node. In the example of FIG. 8, the output of node 8014 may be represented by equation (11) below if the bias b is not added, or equation (12) below if the bias b is added:

$$\text{Output} = f(x_1w_1 + x_2w_2 + x_3w_3 + x_nw_n) \tag{11}$$

$$\text{Output} = f(x_1w_1 + x_2w_2 + x_3w_3 + x_nw_n + b) \tag{12}$$

Figure 9:
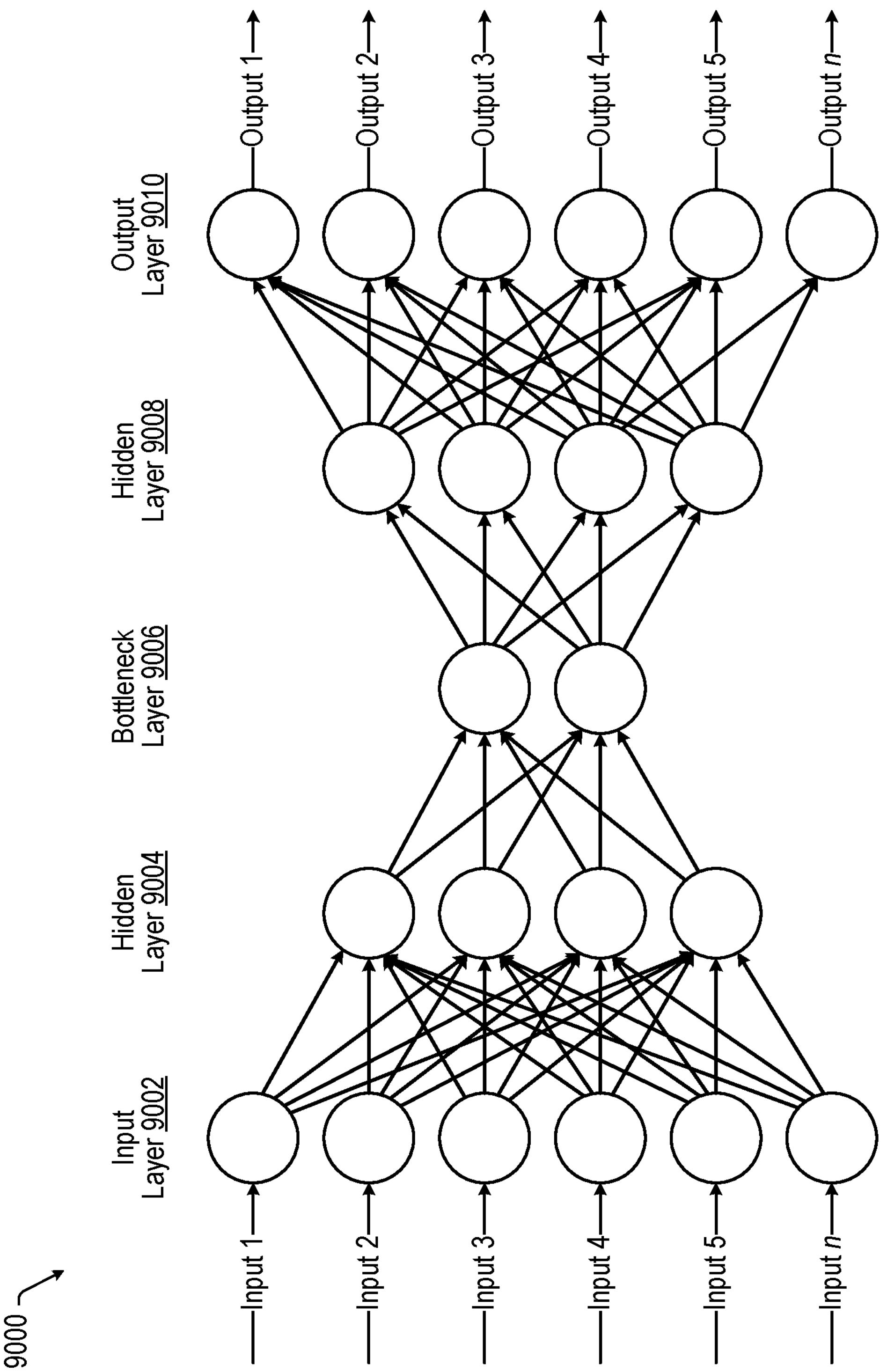
FIG. 9 is a graphical representation of an example neural network for implementing a multivariate machine learning model.

FIG. 9 is a graphical representation of an example neural network 9000 for implementing the multivariate machine learning model. As shown in FIG. 9, neural network 9000 may include an input layer—such as input layer 9002, a first hidden layer—such as hidden layer 9006, a second hidden layer—such as hidden layer 9008, and an output layer—such as output layer 9010. In the example of FIG. 9, input layer 9002 has more nodes than hidden layer 9004, hidden layer 9004 has more nodes than bottleneck layer 9006, bottleneck layer 9006 has fewer nodes than hidden layer 9008, and hidden layer 9008 has fewer nodes than output layer 9010. In some embodiments, input layer 9002 has the same number of nodes as output layer 9010. Although only one hidden layer is shown between input layer 9002 and bottleneck layer 9006, there may be any number of hidden layers between input layer 9002 and bottleneck layer 9006. Similarly, although only one hidden layer is shown between bottleneck layer 9006 and output layer 9010, there may be any number of hidden layers between bottleneck layer 9006 and output layer 9010. In the example of FIG. 9, each node of a previous layer of neural network 9000 may be connected to each node of a next layer. So, for example, each node of the input layer 9002 may be connected to each node of the hidden layer 9004, each node of hidden layer 9004 may be connected to each node of bottleneck layer 9006, each node of bottleneck layer 9006 may be connected to each node of hidden layer 9008, and each node of hidden layer 9008 may be connected to each node of output layer 9010. Thus, the neural network shown in FIG. 9 may be referred to as a fully-connected neural network. However, while neural network 9000 is shown as a fully-connected neural network, each node of a previous layer does not necessarily need to be connected to each node of a next layer.

As previously discussed with reference to FIG. 9, each node of a previous layer may be multiplied by a weight. A summation of the nodes of the previous layer multiplied by weights may be fed into a node of the next layer. In some examples, a bias may be added to the summation before it is fed into the node of the next layer. At the node of the next layer, the summation—with or without the added bias—is fed into an activation function and output from the node of the next layer. In some embodiments, neural network 9000 may be referred to as an autoencoder. Input layer 9002 and hidden layer 9004 may be referred to as the encoder. The encoder is the part of the autoencoder that compresses the input data into a lower-dimensional representational. Bottleneck layer 9006 represents the output of the encoder and may be a compressed representation of the input data. Bottleneck layer 9006 may capture the most important features of the input data in a compact form. Hidden layer 9008 and output layer 9010 may be referred to as the decoder. The decoder is the part of the autoencoder that reconstructs the original input from the compressed representation of the bottleneck layer 9006. In some embodiments, the architecture of the decoder is a mirror image of the encoder. The decoder reconstructs the original input data as accurately as possible from the compact representation. In some implementations, bottleneck layer 9006 includes about ¼ a number of nodes of input layer 9002 (rounded up to the nearest integer). In various implementations, hidden layer 9004 and hidden layer 9008 each include about ½ the number of nodes of input layer 9002 (rounded up to the nearest integer). In some examples, hidden layer 9004 and hidden layer 9008 each include about ⅔ the number of nodes of input layer 9002 (rounded up to the nearest integer).

Figure 10:
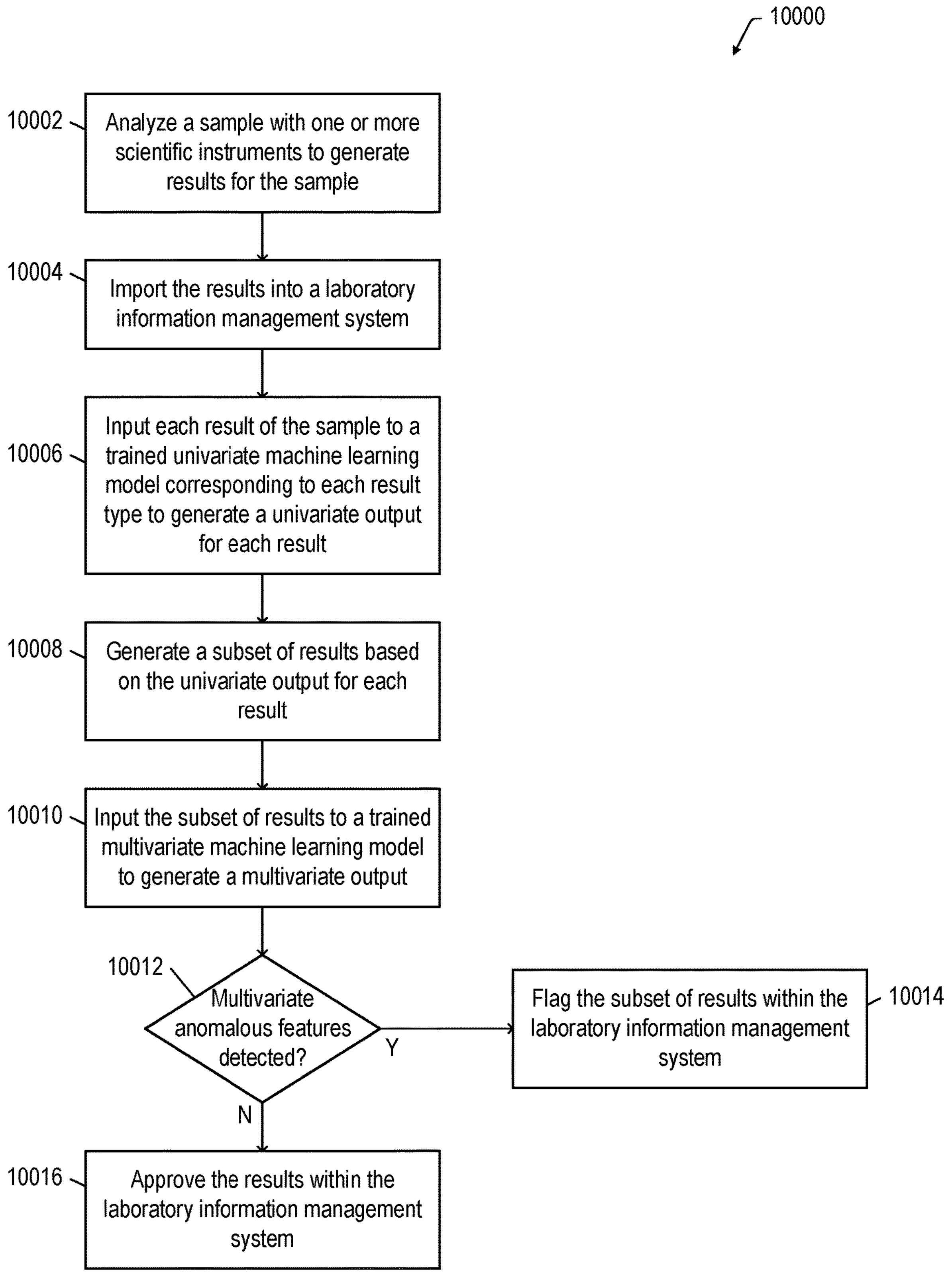
FIG. 10 is a flowchart of an example process for detecting multivariate anomalies within results generated by a scientific instrument.

FIG. 10 is a flowchart of an example process 10000 for detecting multivariate anomalies within results generated by a scientific instrument. At 10002, the scientific instrument analyzes a sample with one or more scientific instruments to generate results for the sample. At 10004, the results are imported into a laboratory information management system. At 10006, each result of the sample is input to a trained univariate machine learning model corresponding to each result type to generate a univariate output for each result. At 10008, a subset of results is generated based on the univariate output for each result. In various implementations, blocks 10002-10008 may be implemented in a substantially similar manner as blocks 2002-2008 of process 2000.

At 10010, the subset of results may be provided to a trained multivariate machine learning model to generate a multivariate output. In some embodiments, the multivariate machine learning model may include a trained machine model suitable for detecting anomalous results within a set of results. For example, the multivariate machine learning model may be a trained Isolation Forest model, a trained Local Outlier Factor model, and/or a trained One-Class Support Vector Machine model. Accordingly, the multivariate output includes which of the input features (e.g., results) are predicted to be anomalous. At 10012, the multivariate output is analyzed to determine whether multivariate anomalous features are detected. In response to multivariate anomalous features being detected ("YES" at decision block 10014), the subset of results, the set of results, and/or the sample corresponding to the results is flagged within the laboratory information management system as being potentially anomalous at 10014. In various implementations, block 10014 may be implemented in a substantially similar manner as block 2016 of process 2000. In response to multivariate anomalous features not being detected ("NO" at decision block 10014), the subset of results, the set of results, and/or the sample corresponding to the results is approved within the laboratory information management system at 10016.

Although the operations of processes 2000-7000 and 10000 may be illustrated with reference to particular embodiments disclosed herein (e.g., the scientific instrument support modules 1000 discussed herein with reference to FIG. 1, the GUI 11000 discussed herein with reference to FIG. 11, the computing devices 12000 discussed herein with reference to FIG. 12, and/or the scientific instrument support system 13000 discussed herein with reference to FIG. 13), processes 2000-7000 and 10000 may be used in any suitable setting to perform any suitable support operations. Operations are illustrated once each and in a particular order in FIGS. 2-7B and 10, but the operations may be reordered and/or repeated as desired and appropriate (e.g., different operations performed may be performed in parallel, as suitable).

Figure 12:
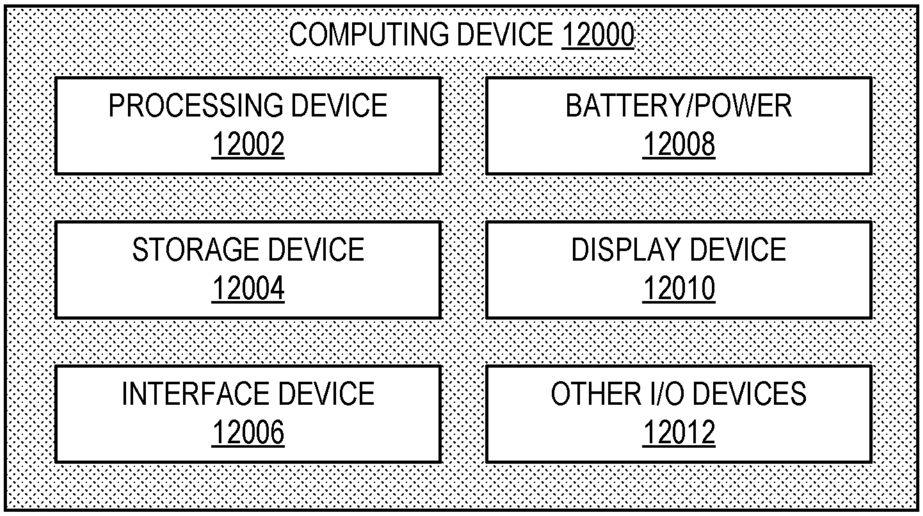
FIG. 12 is a block diagram of a computing device that may perform some or all of the scientific instrument support methods disclosed herein, in accordance with various embodiments.
Figure 13:
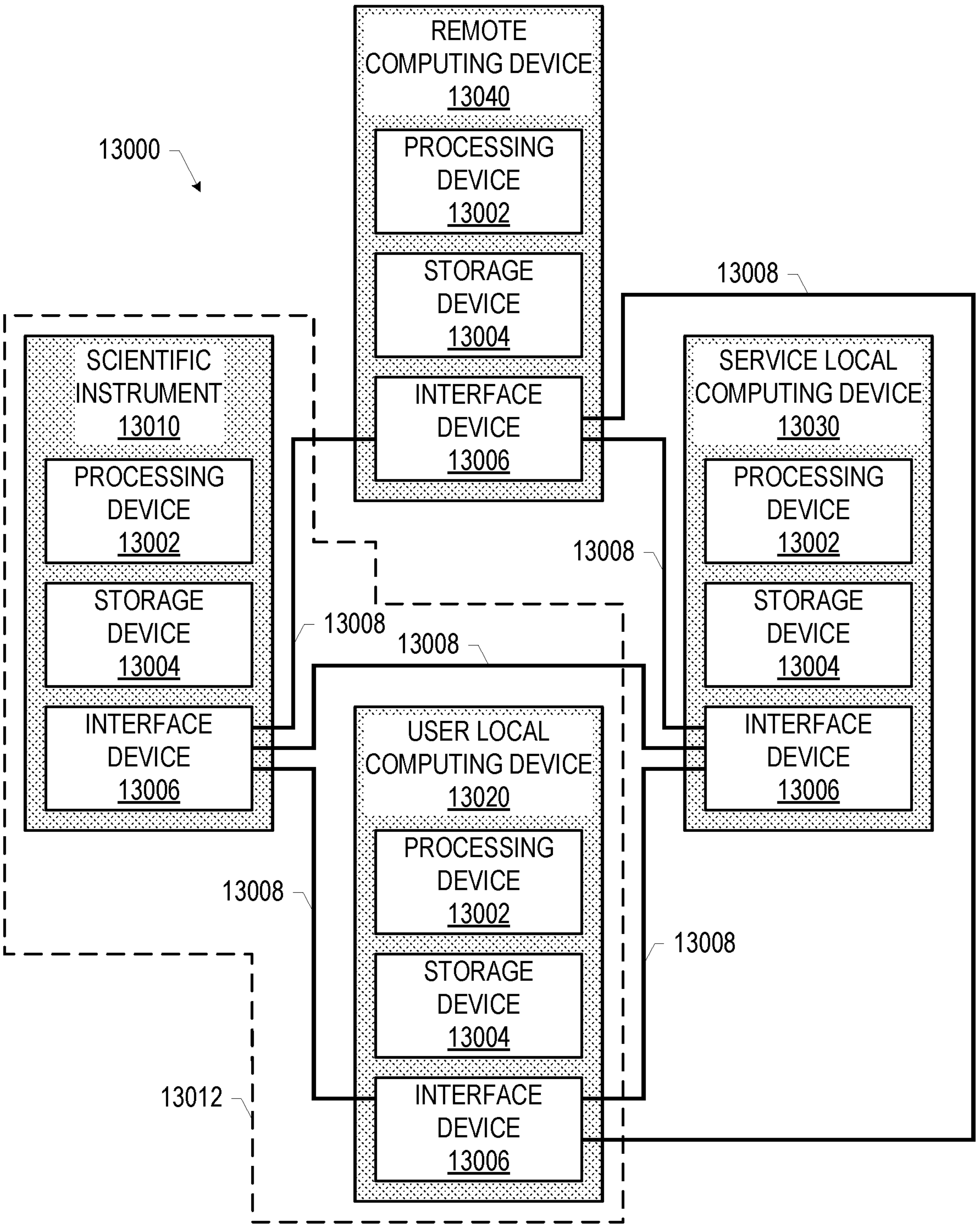
FIG. 13 is a block diagram of an example scientific instrument support system in which some or all of the scientific instrument support methods disclosed herein may be performed, in accordance with various embodiments.

The scientific instrument support methods disclosed herein may include interactions with a human user (e.g., via the user local computing device 13020 discussed herein with reference to FIG. 13). These interactions may include providing information to the user (e.g., information regarding the operation of a scientific instrument such as the scientific instrument 13010 of FIG. 13, information regarding a sample being analyzed or other test or measurement performed by a scientific instrument, information retrieved from a local or remote database, or other information) or providing an option for a user to input commands (e.g., to control the operation of a scientific instrument such as the scientific instrument 13010 of FIG. 13, or to control the analysis of data generated by a scientific instrument), queries (e.g., to a local or remote database), or other information. In some embodiments, these interactions may be performed through a graphical user interface (GUI) that includes a visual display on a display device (e.g., the display device 12010 discussed herein with reference to FIG. 12) that provides outputs to the user and/or prompts the user to provide inputs (e.g., via one or more input devices, such as a keyboard, mouse, trackpad, or touchscreen, included in the other I/O devices 12012 discussed herein with reference to FIG. 12). The scientific instrument support systems disclosed herein may include any suitable GUIs for interaction with a user.

Figure 11:
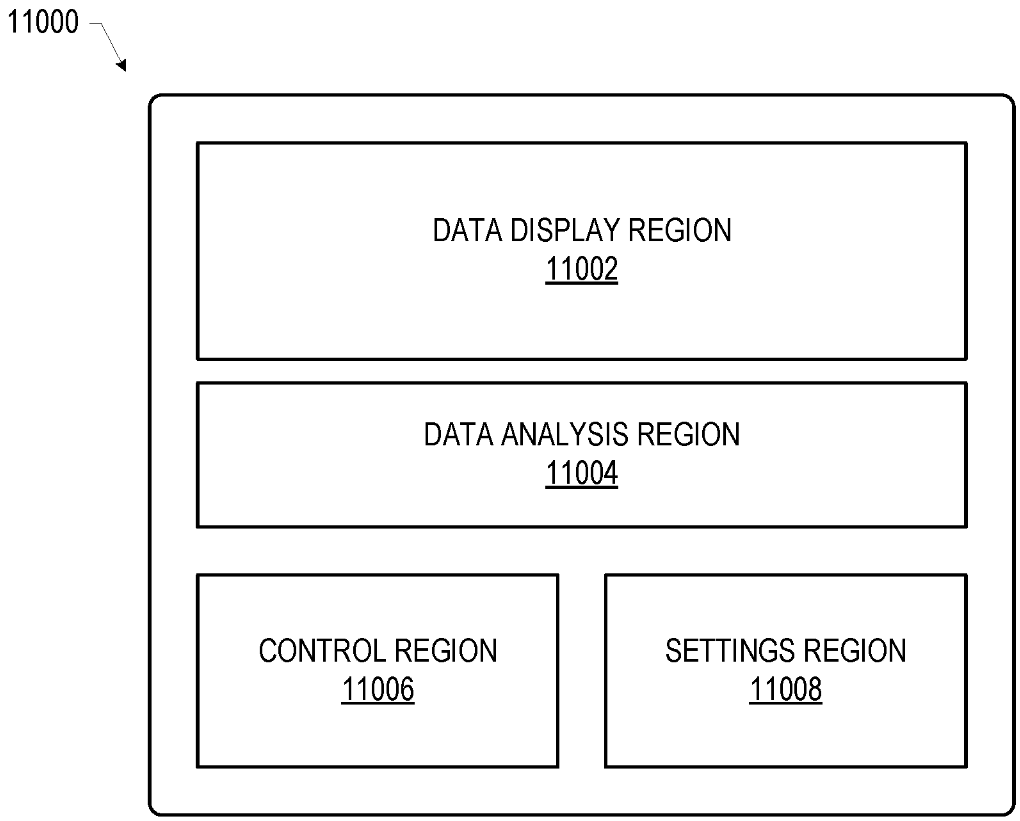
FIG. 11 depicts an example graphical user interface that may be used in the performance of some or all of the support methods disclosed herein, in accordance with various embodiments.

FIG. 11 depicts an example GUI 11000 that may be used in the performance of some or all of the support methods disclosed herein, in accordance with various embodiments. As noted above, the GUI 11000 may be provided on a display device (e.g., the display device 12010 discussed herein with reference to FIG. 12) of a computing device (e.g., the computing device 12000 discussed herein with reference to FIG. 12) of a scientific instrument support system (e.g., the scientific instrument support system 13000 discussed herein with reference to FIG. 13), and a user may interact with the GUI 11000 using any suitable input device (e.g., any of the input devices included in the other I/O devices 12012 discussed herein with reference to FIG. 12) and input technique (e.g., movement of a cursor, motion capture, facial recognition, gesture detection, voice recognition, actuation of buttons, etc.).

The GUI 11000 may include a data display region 11002, a data analysis region 11004, a scientific instrument control region 11006, and a settings region 11008. The particular number and arrangement of regions depicted in FIG. 11 is simply illustrative, and any number and arrangement of regions, including any desired features, may be included in a GUI 11000. The data display region 11002 may display data generated by a scientific instrument (e.g., the scientific instrument 13010 discussed herein with reference to FIG. 13). For example, the data display region 11002 may display results generated by one or more scientific instruments analyzing one or more samples, as previously described with reference to FIGS. 2-7B. The data analysis region 11004 may display the results of data analysis (e.g., the results of analyzing the data illustrated in the data display region 11002 and/or other data). For example, the data analysis region 11004 may display any of the previously described reports generated by reporting and analytics logic 1016. In some embodiments, the data display region 11002 and the data analysis region 11004 may be combined in the GUI 11000 (e.g., to include data output from a scientific instrument, and some analysis of the data, in a common graph or region).

The scientific instrument control region 11006 may include options that allow the user to control a scientific instrument (e.g., the scientific instrument 13010 discussed herein with reference to FIG. 13). The settings region 11008 may include options that allow the user to control the features and functions of the GUI 11000 (and/or other GUIs) and/or perform common computing operations with respect to the data display region 11002 and data analysis region 11004 (e.g., saving data on a storage device, such as the storage device 12004 discussed herein with reference to FIG. 12, sending data to another user, labeling data, etc.).

As noted above, the scientific instrument support module 1000 may be implemented by one or more computing devices. FIG. 12 is a block diagram of a computing device 12000 that may perform some or all of the scientific instrument support methods disclosed herein, in accordance with various embodiments. In some embodiments, the scientific instrument support module 1000 may be implemented by a single computing device 12000 or by multiple computing devices 12000. Further, as discussed below, a computing device 12000 (or multiple computing devices 12000) that implements the scientific instrument support module 1000 may be part of one or more of the scientific instrument 13010, the user local computing device 13020, the service local computing device 13030, or the remote computing device 13040 of FIG. 13.

The computing device 12000 of FIG. 12 is illustrated as having a number of components, but any one or more of these components may be omitted or duplicated, as suitable for the application and setting. In some embodiments, some or all of the components included in the computing device 12000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 12002 and one or more storage devices 12004). Additionally, in various embodiments, the computing device 12000 may not include one or more of the components illustrated in FIG. 12, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 12000 may not include a display device 12010, but may include display device interface circuitry (e.g., a connector and driver circuitry) to which a display device 12010 may be coupled.

The computing device 12000 may include a processing device 12002 (e.g., one or more processing devices). As used herein, the term "processing device" may refer to any device or portion of a device that processes electronic data from registers and/or memory to transform that electronic data into other electronic data that may be stored in registers and/or memory. The processing device 12002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 12000 may include a storage device 12004 (e.g., one or more storage devices). The storage device 12004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 12004 may include memory that shares a die with a processing device 12002. In such an embodiment, the memory may be used as cache memory and may include embedded dynamic random access memory (eDRAM) or spin transfer torque magnetic random access memory (STT-MRAM), for example. In some embodiments, the storage device 12004 may include non-transitory computer readable media having instructions thereon that, when executed by one or more processing devices (e.g., the processing device 12002), cause the computing device 12000 to perform any appropriate ones of or portions of the methods disclosed herein.

The computing device 12000 may include an interface device 12006 (e.g., one or more interface devices 12006). The interface device 12006 may include one or more communication chips, connectors, and/or other hardware and software to govern communications between the computing device 12000 and other computing devices. For example, the interface device 12006 may include circuitry for managing wireless communications for the transfer of data to and from the computing device 12000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 12006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 12006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 12006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 12006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 12006 may include one or more antennas (e.g., one or more antenna arrays) to receipt and/or transmission of wireless communications.

In some embodiments, the interface device 12006 may include circuitry for managing wired communications, such as electrical, optical, or any other suitable communication protocols. For example, the interface device 12006 may include circuitry to support communications in accordance with Ethernet technologies. In some embodiments, the interface device 12006 may support both wireless and wired communication, and/or may support multiple wired communication protocols and/or multiple wireless communication protocols. For example, a first set of circuitry of the interface device 12006 may be dedicated to shorter-range wireless communications such as Wi-Fi or Bluetooth, and a second set of circuitry of the interface device 12006 may be dedicated to longer-range wireless communications such as global positioning system (GPS), EDGE, GPRS, CDMA, WiMAX, LTE, EV-DO, or others. In some embodiments, a first set of circuitry of the interface device 12006 may be dedicated to wireless communications, and a second set of circuitry of the interface device 12006 may be dedicated to wired communications.

The computing device 12000 may include battery/power circuitry 12008. The battery/power circuitry 12008 may include one or more energy storage devices (e.g., batteries or capacitors) and/or circuitry for coupling components of the computing device 12000 to an energy source separate from the computing device 12000 (e.g., AC line power).

The computing device 12000 may include a display device 12010 (e.g., multiple display devices). The display device 12010 may include any visual indicators, such as a heads-up display, a computer monitor, a projector, a touchscreen display, a liquid crystal display (LCD), a light-emitting diode display, or a flat panel display.

The computing device 12000 may include other input/output (I/O) devices 12012. The other I/O devices 12012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 12000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 12000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the scientific instrument support modules or methods disclosed herein may be part of a scientific instrument support system. FIG. 13 is a block diagram of an example scientific instrument support system 13000 in which some or all of the scientific instrument support methods disclosed herein may be performed, in accordance with various embodiments. The scientific instrument support modules and methods disclosed herein (e.g., the scientific instrument support module 1000 of FIG. 1 and the processes 2000-7000 and 10000 of FIGS. 2-7B and 10) may be implemented by one or more of the scientific instrument 13010, the user local computing device 13020, the service local computing device 13030, or the remote computing device 13040 of the scientific instrument support system 13000.

Any of the scientific instrument 13010, the user local computing device 13020, the service local computing device 13030, or the remote computing device 13040 may include any of the embodiments of the computing device 12000 discussed herein with reference to FIG. 12, and any of the scientific instrument 13010, the user local computing device 13020, the service local computing device 13030, or the remote computing device 13040 may take the form of any appropriate ones of the embodiments of the computing device 12000 discussed herein with reference to FIG. 12.

The scientific instrument 13010, the user local computing device 13020, the service local computing device 13030, or the remote computing device 13040 may each include a processing device 13002, a storage device 13004, and an interface device 13006. The processing device 13002 may take any suitable form, including the form of any of the processing devices 12002 discussed herein with reference to FIG. 12, and the processing devices 13002 included in different ones of the scientific instrument 13010, the user local computing device 13020, the service local computing device 13030, or the remote computing device 13040 may take the same form or different forms. The storage device 13004 may take any suitable form, including the form of any of the storage devices 13004 discussed herein with reference to FIG. 12, and the storage devices 13004 included in different ones of the scientific instrument 13010, the user local computing device 13020, the service local computing device 13030, or the remote computing device 13040 may take the same form or different forms. The interface device 13006 may take any suitable form, including the form of any of the interface devices 12006 discussed herein with reference to FIG. 12, and the interface devices 13006 included in different ones of the scientific instrument 13010, the user local computing device 13020, the service local computing device 13030, or the remote computing device 13040 may take the same form or different forms.

The scientific instrument 13010, the user local computing device 13020, the service local computing device 13030, and the remote computing device 13040 may be in communication with other elements of the scientific instrument support system 13000 via communication pathways 13008. The communication pathways 13008 may communicatively couple the interface devices 13006 of different ones of the elements of the scientific instrument support system 13000, as shown, and may be wired or wireless communication pathways (e.g., in accordance with any of the communication techniques discussed herein with reference to the interface devices 12006 of the computing device 12000 of FIG. 12). The particular scientific instrument support system 13000 depicted in FIG. 13 includes communication pathways between each pair of the scientific instrument 13010, the user local computing device 13020, the service local computing device 13030, and the remote computing device 13040, but this “fully connected” implementation is simply illustrative, and in various embodiments, various ones of the communication pathways 13008 may be absent. For example, in some embodiments, a service local computing device 13030 may not have a direct communication pathway 13008 between its interface device 13006 and the interface device 13006 of the scientific instrument 13010, but may instead communicate with the scientific instrument 13010 via the communication pathway 13008 between the service local computing device 13030 and the user local computing device 13020 and the communication pathway 13008 between the user local computing device 13020 and the scientific instrument 13010.

The user local computing device 13020 may be a computing device (e.g., in accordance with any of the embodiments of the computing device 12000 discussed herein) that is local to a user of the scientific instrument 13010. In some embodiments, the user local computing device 13020 may also be local to the scientific instrument 13010, but this need not be the case; for example, a user local computing device 13020 that is in a user’s home or office may be remote from, but in communication with, the scientific instrument 13010 so that the user may use the user local computing device 13020 to control and/or access data from the scientific instrument 13010. In some embodiments, the user local computing device 13020 may be a laptop, smartphone, or tablet device. In some embodiments the user local computing device 13020 may be a portable computing device.

The service local computing device 13030 may be a computing device (e.g., in accordance with any of the embodiments of the computing device 12000 discussed herein) that is local to an entity that services the scientific instrument 13010. For example, the service local computing device 13030 may be local to a manufacturer of the scientific instrument 13010 or to a third-party service company. In some embodiments, the service local computing device 13030 may communicate with the scientific instrument 13010, the user local computing device 13020, and/or the remote computing device 13040 (e.g., via a direct communication pathway 13008 or via multiple “indirect” communication pathways 13008, as discussed above) to receive data regarding the operation of the scientific instrument 13010, the user local computing device 13020, and/or the remote computing device 13040 (e.g., the results of self-tests of the scientific instrument 13010, calibration coefficients used by the scientific instrument 13010, the measurements of sensors associated with the scientific instrument 13010, etc.). In some embodiments, the service local computing device 13030 may communicate with the scientific instrument 13010, the user local computing device 13020, and/or the remote computing device 13040 (e.g., via a direct communication pathway 13008 or via multiple “indirect” communication pathways 13008, as discussed above) to transmit data to the scientific instrument 13010, the user local computing device 13020, and/or the remote computing device 13040 (e.g., to update programmed instructions, such as firmware, in the scientific instrument 13010, to initiate the performance of test or calibration sequences in the scientific instrument 13010, to update programmed instructions, such as software, in the user local computing device 13020 or the remote computing device 13040, etc.). A user of the scientific instrument 13010 may utilize the scientific instrument 13010 or the user local computing device 13020 to communicate with the service local computing device 13030 to report a problem with the scientific instrument 13010 or the user local computing device 13020, to request a visit from a technician to improve the operation of the scientific instrument 13010, to order consumables or replacement parts associated with the scientific instrument 13010, or for other purposes.

The remote computing device 13040 may be a computing device (e.g., in accordance with any of the embodiments of the computing device 12000 discussed herein) that is remote from the scientific instrument 13010 and/or from the user local computing device 13020. In some embodiments, the remote computing device 13040 may be included in a datacenter or other large-scale server environment. In some embodiments, the remote computing device 13040 may include network-attached storage (e.g., as part of the storage device 13004). The remote computing device 13040 may store data generated by the scientific instrument 13010, perform analyses of the data generated by the scientific instrument 13010 (e.g., in accordance with programmed instructions), facilitate communication between the user local computing device 13020 and the scientific instrument 13010, and/or facilitate communication between the service local computing device 13030 and the scientific instrument 13010.

In some embodiments, one or more of the elements of the scientific instrument support system 13000 illustrated in FIG. 13 may not be present. Further, in some embodiments, multiple ones of various ones of the elements of the scientific instrument support system 13000 of FIG. 13 may be present. For example, a scientific instrument support system 13000 may include multiple user local computing devices 13020 (e.g., different user local computing devices 13020 associated with different users or in different locations). In another example, a scientific instrument support system 13000 may include multiple scientific instruments 13010, all in communication with service local computing device 13030 and/or a remote computing device 13040; in such an embodiment, the service local computing device 13030 may monitor these multiple scientific instruments 13010, and the service local computing device 13030 may cause updates or other information may be “broadcast” to multiple scientific instruments 13010 at the same time. Different ones of the scientific instruments 13010 in a scientific instrument support system 13000 may be located close to one another (e.g., in the same room) or farther from one another (e.g., on different floors of a building, in different buildings, in different cities, etc.). In some embodiments, a scientific instrument 13010 may be connected to an Internet-of-Things (IoT) stack that allows for command and control of the scientific instrument 13010 through a web-based application, a virtual or augmented reality application, a mobile application, and/or a desktop application. Any of these applications may be accessed by a user operating the user local computing device 13020 in communication with the scientific instrument 13010 by the intervening remote computing device 13040. In some embodiments, a scientific instrument 13010 may be sold by the manufacturer along with one or more associated user local computing devices 13020 as part of a local scientific instrument computing unit 13012.

The following paragraphs provide various examples of the embodiments disclosed herein.

Example 1 includes a method of detecting sample anomalies within a laboratory information management system. The method includes obtaining a first result for a sample within the laboratory information management system, processing, within the laboratory information management system, the first result via a univariate machine learning model trained using unsupervised machine learning, processing, within the laboratory information management system, a plurality of results for the sample via a multivariate machine learning model in response to the univariate machine learning model generating a normal output for the first result, and flagging, within the laboratory information management system, the sample for rejection processing in response to the multivariate machine learning model generating an abnormal output for the plurality of samples. The first result represents a first type of result, the plurality of results includes the first result and each of the plurality of results represents a different type of result for the sample, and the multivariate machine learning model is trained using unsupervised machine learning.

Example 2 includes the subject matter of Example 1 and further specifies that processing the plurality of results via the multivariate machine learning model includes generating an input vector from the plurality of results and providing the input vector to the multivariate machine learning model to generate an output vector.

Example 3 includes the subject matter of Example 2 and further specifies generating the abnormal output for the plurality of results in response to an anomaly score computed based on a comparison of the input vector and the output vector exceeding a threshold value.

Example 4 includes the subject matter of Example 3 and further specifies setting the threshold value based on a training dataset. Setting the threshold value based on the training dataset includes loading a training dataset including training results for a plurality of training samples, inputting the training results to the multivariate machine learning model to generate training outputs, computing differences between the training results and the training outputs, and computing the threshold value based on the differences.

Example 5 includes the subject matter of Example 4 and further specifies that computing the threshold value based on the differences includes ordering the differences in ascending order, computing a first training value based on a lower percentile threshold of the ordered differences, computing a second training value based on an upper percentile threshold of the ordered differences, computing a first range based on a difference between the first training value and the second training value, and computing the threshold value as a function of the second training value and the first range.

Example 6 includes the subject matter of any of Examples 1-5 and further specifies that the multivariate machine learning model includes a neural network.

Example 7 includes the subject matter of Example 6 and further specifies that the neural network includes an autoencoder.

Example 8 includes the subject matter of Example 6 and further specifies that the neural network includes a variational autoencoder.

Example 9 includes the subject matter of Example 1 and further specifies that the multivariate machine learning model is configured to identify anomalous features in the plurality of results.

Example 10 includes the subject matter of Example 9 and further specifies generating the abnormal output for the plurality of results in response to identifying anomalous features in the plurality of results.

Example 11 includes the subject matter of any of Examples 9 or 10 and further specifies that the multivariate machine learning model is an isolation forest model.

Example 12 includes the subject matter of any of Examples 9 or 10 and further specifies that the multivariate machine learning model is a local outlier factor model.

Example 13 includes the subject matter of any of Examples 9 or 10 and further specifies that the multivariate machine learning model is a one-class support vector machine.

Example 14 includes the subject matter of any of Examples 1-13 and further specifies training the univariate machine learning model. Training the univariate machine learning model includes loading a plurality of training results from the laboratory information management system, each result of the plurality of training results being the first type of result, ordering the plurality of training results in ascending order, computing a first observation value based on a lower percentile threshold of the ordered plurality of training results, computing a second observation value based on an upper percentile threshold of the ordered plurality of training results, computing a second range based on a difference between the first observation value and the second observation value, setting a minimum threshold as a function of the first observation value and the second range, and setting a maximum threshold as a function of the second observation value and the second range.

Example 15 includes the subject matter of Example 14 and further specifies generating the normal output for the first result in response to determining the first result does not exceed the maximum threshold.

Example 16 includes the subject matter of any of Examples 14 or 15 and further specifies generating the normal output for the first result in response to determining the first result is not below the minimum threshold.

Example 17 includes the subject matter of any of Examples 14-16 and further specifies generating an abnormal output in response to determining the first result exceeds the maximum threshold or is below the minimum threshold.

Example 18 includes the subject matter of any of Examples 1-17 and further specifies that flagging the sample for rejection processing includes generating a notification on a graphical user interface, wherein the notification includes at least one of (i) anomaly scores per feature, (ii) graphs, or (iii) graphical representations of clusters.

Example 19 includes the subject matter of any of Examples 1-17 and further specifies that flagging the sample for rejection processing includes flagging the sample for manual processing.

Example 20 includes the subject matter of any of Examples 1-19 and further specifies that flagging the sample for rejection processing includes adding, within the laboratory information management system, an anomaly tag to the plurality of results.

Example 21 includes a scientific instrument support apparatus that includes memory hardware configured to store instructions and processing hardware configured to execute the instructions. The instructions include obtaining a first result for a sample within a laboratory information management system, processing, within the laboratory information management system, the first result via a univariate machine learning model trained using unsupervised machine learning, processing, within the laboratory information management system, a plurality of results for the sample via a multivariate machine learning model in response to the univariate machine learning model generating a normal output for the first result, the multivariate machine learning model trained using unsupervised machine learning, and flagging, within the laboratory information management system, the sample for rejection processing in response to the multivariate machine learning model generating an abnormal output for the plurality of samples. The first result represents a first type of result, the plurality of results include the first result, and each of the plurality of results represents a different type of result for the sample.

Example 22 includes the subject matter of Example 21 and further specifies that processing the plurality of results via the multivariate machine learning model includes generating an input vector from the plurality of results and providing the input vector to the multivariate machine learning model to generate an output vector.

Example 23 includes the subject matter of Example 22 and further specifies that the instructions further comprise generating the abnormal output for the plurality of results in response to an anomaly score computed based on a comparison of the input vector and the output vector exceeding a threshold value.

Example 24 includes the subject matter of Example 23 and further specifies that the instructions further comprise setting the threshold value based on a training dataset. Setting the threshold value based on the training dataset includes loading a training dataset including training results for a plurality of training samples, inputting the training results to the multivariate machine learning model to generate training outputs, computing differences between the training results and the training outputs, and computing the threshold value based on the differences.

Example 25 includes the subject matter of Example 24 and further specifies that computing the threshold value based on the differences includes ordering the differences in ascending order, computing a first training value based on a lower percentile threshold of the ordered differences, computing a second training value based on an upper percentile threshold of the ordered differences, computing a first range based on a difference between the first training value and the second training value, and computing the threshold value as a function of the second training value and the first range.

Example 26 includes the subject matter of any of Examples 21-25 and further specifies that the multivariate machine learning model includes a neural network.

Example 27 includes the subject matter of Example 26 and further specifies that the neural network includes an autoencoder.

Example 28 includes the subject matter of Example 26 and further specifies that the neural network includes a variational autoencoder.

Example 29 includes the subject matter of Example 21 and further specifies that the multivariate machine learning model is configured to identify anomalous features in the plurality of results.

Example 30 includes the subject matter of Example 29 and further specifies that the instructions further comprise generating the abnormal output for the plurality of results in response to identifying anomalous features in the plurality of results.

Example 31 includes the subject matter of any of Examples 29 or 30 and further specifies that the multivariate machine learning model is an isolation forest model.

Example 32 includes the subject matter of any of Examples 29 or 30 and further specifies that the multivariate machine learning model is a local outlier factor model.

Example 33 includes the subject matter of any of Examples 29 or 30 and further specifies that the multivariate machine learning model is a one-class support vector machine.

Example 34 includes the subject matter of any of Examples 21-33 and further specifies that the instructions further comprise training the univariate machine learning model. Training the univariate machine learning model includes loading a plurality of training results from the laboratory information management system, each result of the plurality of training results being the first type of result, ordering the plurality of training results in ascending order, computing a first observation value based on a lower percentile threshold of the ordered plurality of training results, computing a second observation value based on an upper percentile threshold of the ordered plurality of training results, computing a second range based on a difference between the first observation value and the second observation value, setting a minimum threshold as a function of the first observation value and the second range, and setting a maximum threshold as a function of the second observation value and the second range.

Example 35 includes the subject matter of Example 34 and further specifies that the instructions further comprise generating the normal output for the first result in response to determining the first result does not exceed the maximum threshold.

Example 36 includes the subject matter of any of Examples 34 or 35 and further specifies that the instructions further comprise generating the normal output for the first result in response to determining the first result is not below the minimum threshold.

Example 37 includes the subject matter of any of Examples 34-36 and further specifies that the instructions further comprise generating an abnormal output in response to determining the first result exceeds the maximum threshold or is below the minimum threshold.

Example 38 includes the subject matter of any of Examples 21-37 and further specifies that flagging the sample for rejection processing includes generating a notification on a graphical user interface, wherein the notification includes at least one of (i) anomaly scores per feature, (ii) graphs, or (iii) graphical representations of clusters.

Example 39 includes the subject matter of any of Examples 21-37 and further specifies that flagging the sample for rejection processing includes flagging the sample for manual processing.

Example 40 includes the subject matter of any of Examples 21-39 and further specifies that flagging the sample for rejection processing includes adding, within the laboratory information management system, an anomaly tag to the first result and the second result.

Example 41 includes a computer-implemented method that includes processing a sample with a scientific instrument to generate a plurality of results, inputting at least one result of the plurality of results to a trained univariate machine learning model to generate a univariate output for each result, inputting the univariate outputs to a trained multivariate machine learning model to generate a multivariate output, computing an anomaly score between the univariate outputs input to the trained multivariate machine learning model and the multivariate output, and flagging, within a laboratory information management system, the sample for rejection processing in response to determining that the anomaly score exceeds a threshold.

Example 42 includes the subject matter of Example 41 and further specifies generating an input vector based on the univariate outputs and providing the input vector to the trained multivariate machine learning model to generate the multivariate output. Computing the anomaly score between the univariate outputs input to the trained multivariate machine learning model and the multivariate output includes computing a distance between the input vector and the multivariate output.

Example 43 includes the subject matter of Example 42 and further specifies training a multivariate machine learning model. Training the multivariate machine learning model includes generating a training input vector based on a training sample retrieved from the laboratory information management system, providing the training input vector to the multivariate machine learning model to generate a training output vector, computing a distance between the training input vector and the training output vector, and updating parameters of the multivariate machine learning model and saving the multivariate machine learning model configured with the updated parameters as the trained multivariate machine learning model in response to determining that the distance exceeds a threshold.

Example 44 includes the subject matter of Example 43 and further specifies that training the multivariate machine learning model includes saving the multivariate machine learning model as the trained multivariate machine learning model in response to determining that the distance does not exceed the threshold.

Example 45 includes the subject matter of any of Examples 41-44 and further specifies that the trained multivariate machine learning model comprises a neural network.

Example 46 includes the subject matter of Example 45 and further specifies that the neural network comprises an autoencoder.

Example 47 includes the subject matter of any of Examples 41-45 and further specifies training the univariate machine learning model. Training the univariate machine learning model includes loading a plurality of training results from the laboratory information management system, ordering the plurality of training results in ascending order, computing a first observation value based on a lower percentile threshold of the ordered plurality of training results, computing a second observation value based on an upper percentile threshold of the ordered plurality of training results, computing a range based on a difference between the first observation value and the second observation value, setting a minimum threshold as a function of the first observation value and the range, and setting a maximum threshold as a function of the second observation value and the range. Each result of the plurality of training results being a first type of result Example 48 includes the subject matter of Example 47 and further specifies that the lower percentile threshold is about a 25th percentile.

Example 49 includes the subject matter of any of Examples 47 or 48 and further specifies that the upper percentile threshold is about a 75th percentile.

Example 50 includes the subject matter of any of Examples 47-49 and further specifies that inputting the univariate outputs to a trained multivariate machine learning model includes loading a selected result from the sample, wherein the selected result is the first type of result, determining whether the selected result is within a range between the minimum threshold and the maximum threshold, and adding the selected result to an input vector for the trained multivariate machine learning model in response to determining that the selected result is within a range between the minimum threshold and the maximum threshold.

Example 51 includes a scientific instrument support apparatus that includes memory hardware configured to store instructions and processing hardware configured to execute the instructions. The instructions include processing a sample with a scientific instrument to generate a plurality of results, inputting at least one result of the plurality of results to a trained univariate machine learning model to generate a univariate output for each result, inputting the univariate outputs to a trained multivariate machine learning model to generate a multivariate output, computing an anomaly score between the univariate outputs input to the trained multivariate machine learning model and the multivariate output, and flagging, within a laboratory information management system, the sample for rejection processing in response to determining that the anomaly score exceeds a threshold.

Example 52 includes the subject matter of Example 51 and further specifies that the instructions further comprise generating an input vector based on the univariate outputs and providing the input vector to the trained multivariate machine learning model to generate the multivariate output. Computing the anomaly score between the univariate outputs input to the trained multivariate machine learning model and the multivariate output includes computing a distance between the input vector and the multivariate output.

Example 53 includes the subject matter of Example 52 and further specifies that the instructions further comprise training a multivariate machine learning model. Training the multivariate machine learning model includes generating a training input vector based on a training sample retrieved from the laboratory information management system, providing the training input vector to the multivariate machine learning model to generate a training output vector, computing a distance between the training input vector and the training output vector, and updating parameters of the multivariate machine learning model and saving the multivariate machine learning model configured with the updated parameters as the trained multivariate machine learning model in response to determining that the distance exceeds a threshold.

Example 54 includes the subject matter of Example 53 and further specifies that training the multivariate machine learning model includes saving the multivariate machine learning model as the trained machine learning model in response to determining that the distance does not exceed the threshold.

Example 55 includes the subject matter of any of Examples 51-54 and further specifies that the trained multivariate machine learning model comprises a neural network.

Example 56 includes the subject matter of Example 55 and further specifies that the neural network comprises an autoencoder.

Example 57 includes the subject matter of any of Examples 51-55 and further specifies that the the instructions further comprise training the univariate machine learning model. Training the univariate machine learning model includes loading a plurality of training results from the laboratory information management system, each result of the plurality of training results being a first type of result, ordering the plurality of training results in ascending order, computing a first observation value based on a lower percentile threshold of the ordered plurality of training results, computing a second observation value based on an upper percentile threshold of the ordered plurality of training results, computing a range based on a difference between the first observation value and the second observation value, setting a minimum threshold as a function of the first observation value and the range, and setting a maximum threshold as a function of the second observation value and the range.

Example 58 includes the subject matter of Example 57 and further specifies that the lower percentile threshold is about a 25th percentile.

Example 59 includes the subject matter of any of Examples 57 or 58 and further specifies that the upper percentile threshold is about a 75th percentile.

Example 60 includes the subject matter of any of Examples 57-59 and further specifies that inputting the univariate outputs to a trained multivariate machine learning model includes loading a selected result from the sample, wherein the selected result is the first type of result, determining whether the selected result is within a range between the minimum threshold and the maximum threshold, and adding the selected result to an input vector for the trained multivariate machine learning model in response to determining that the selected result is within a range between the minimum threshold and the maximum threshold.

Example 61 includes one or more non-transitory computer-readable media having instructions thereon that, when executed by one or more processing devices of a scientific instrument support apparatus, cause the scientific instrument support apparatus to perform the method of any of Examples 1-20.

Example 62 includes one or more non-transitory computer-readable media having instructions thereon that, when executed by one or more processing devices of a scientific instrument support apparatus, cause the scientific instrument support apparatus to perform the method of any of Examples 41-50.

The invention claimed is:

1. A method of detecting sample anomalies within a laboratory information management system including:

obtaining a first result for a sample within the laboratory information management system, the first result representing a first type of result;

processing, within the laboratory information management system, the first result via a univariate machine learning model trained using unsupervised machine learning;

in response to the univariate machine learning model generating a normal output for the first result, processing, within the laboratory information management system, a plurality of results for the sample via a multivariate machine learning model, the plurality of results including the first result and each of the plurality of results representing a different type of result for the sample, the multivariate machine learning model trained using unsupervised machine learning; and in response to the multivariate machine learning model generating an abnormal output for the plurality of samples, flagging, within the laboratory information management system, the sample for rejection processing.

2. The method of claim 1 wherein processing the plurality of results via the multivariate machine learning model includes:

generating an input vector from the plurality of results; and providing the input vector to the multivariate machine learning model to generate an output vector.

3. The method of claim 2, further comprising generating the abnormal output for the plurality of results in response to an anomaly score computed based on a comparison of the input vector and the output vector exceeding a threshold value.

4. The method of claim 3 further comprising setting the threshold value based on a training dataset, wherein setting the threshold value based on the training dataset includes:

loading a training dataset including training results for a plurality of training samples;

inputting the training results to the multivariate machine learning model to generate training outputs;

computing differences between the training results and the training outputs; and computing the threshold value based on the differences.

5. The method of claim 4 wherein computing the threshold value based on the differences includes:

ordering the differences in ascending order;

computing a first training value based on a lower percentile threshold of the ordered differences;

computing a second training value based on an upper percentile threshold of the ordered differences;

computing a first range based on a difference between the first training value and the second training value; and computing the threshold value as a function of the second training value and the first range.

6. The method of claim 1 wherein:

the multivariate machine learning model is configured to identify anomalous features in the plurality of results; and the method further comprises generating the abnormal output for the plurality of results in response to identifying anomalous features in the plurality of results.

7. The method of claim 6 wherein the multivariate machine learning model comprises one of an isolation forest model, a local outlier factor model, or a one-class support vector machine.

8. The method of claim 1 further comprising:

training the univariate machine learning model, wherein training the univariate machine learning model includes:

loading a plurality of training results from the laboratory information management system, each result of the plurality of training results being the first type of result, ordering the plurality of training results in ascending order, computing a first observation value based on a lower percentile threshold of the ordered plurality of training results, computing a second observation value based on an upper percentile threshold of the ordered plurality of training results, computing a second range based on a difference between the first observation value and the second observation value, setting a minimum threshold as a function of the first observation value and the second range, and setting a maximum threshold as a function of the second observation value and the second range;

generating the normal output for the first result in response to determining the first result does not exceed the maximum threshold and is not below the minimum threshold; and generating an abnormal output in response to determining the first result exceeds the maximum threshold or is below the minimum threshold.

9. The method of claim 1, wherein flagging the sample for rejection processing comprises at least one of:

generating a notification on a graphical user interface, wherein the notification includes at least one of (i) anomaly scores per feature, (ii) graphs, or (iii) graphical representations of clusters;

flagging the sample for manual processing; or adding, within the laboratory information management system, an anomaly tag to the plurality of results.

10. A scientific instrument support apparatus including:

memory hardware configured to store instructions and processing hardware configured to execute the instructions, wherein the instructions include:

processing a sample with a scientific instrument to generate a plurality of results;

inputting at least one result of the plurality of results to a trained univariate machine learning model to generate a univariate output for each result;

inputting the univariate outputs to a trained multivariate machine learning model to generate a multivariate output;

computing an anomaly score between the univariate outputs input to the trained multivariate machine learning model and the multivariate output; and in response to determining that the anomaly score exceeds a threshold, flagging, within a laboratory information management system, the sample for rejection processing.

11. The apparatus of claim 10 wherein the instructions further comprise:

generating an input vector based on the univariate outputs; and providing the input vector to the trained multivariate machine learning model to generate the multivariate output;

wherein computing the anomaly score between the univariate outputs input to the trained multivariate machine learning model and the multivariate output includes computing a distance between the input vector and the multivariate output.

12. The apparatus of claim 11 wherein the instructions further comprise training a multivariate machine learning model, wherein training the multivariate machine learning model includes:

generating a training input vector based on a training sample retrieved from the laboratory information management system;

providing the training input vector to the multivariate machine learning model to generate a training output vector;

computing a distance between the training input vector and the training output vector; and in response to determining that the distance exceeds a threshold, updating parameters of the multivariate machine learning model and saving the multivariate machine learning model configured with the updated parameters as the trained multivariate machine learning model.

13. The apparatus of claim 12 wherein training the multivariate machine learning model includes:

in response to determining that the distance does not exceed the threshold, saving the multivariate machine learning model as the trained machine learning model.

14. The apparatus of claim 10 wherein the trained multivariate machine learning model comprises a neural network.

15. The apparatus of claim 14 wherein the neural network comprises an autoencoder.

16. The apparatus of claim 10 wherein the instructions further comprise training the univariate machine learning model, wherein training the univariate machine learning model includes:

loading a plurality of training results from the laboratory information management system, each result of the plurality of training results being a first type of result;

ordering the plurality of training results in ascending order;

computing a first observation value based on a lower percentile threshold of the ordered plurality of training results;

computing a second observation value based on an upper percentile threshold of the ordered plurality of training results;

computing a range based on a difference between the first observation value and the second observation value;

setting a minimum threshold as a function of the first observation value and the range; and setting a maximum threshold as a function of the second observation value and the range.

17. The apparatus of claim 16 wherein the lower percentile threshold is about a 25th percentile.

18. The apparatus of claim 16 wherein the upper percentile threshold is about a 75th percentile.

19. The apparatus of claim 16 wherein inputting the univariate outputs to a trained multivariate machine learning model includes:

loading a selected result from the sample, wherein the selected result is the first type of result;

determining whether the selected result is within a range between the minimum threshold and the maximum threshold; and in response to determining that the selected result is within a range between the minimum threshold and the maximum threshold, adding the selected result to an input vector for the trained multivariate machine learning model.

20. One or more non-transitory computer-readable media having instructions thereon that, when executed by one or more processing devices of a scientific instrument support apparatus, cause the scientific instrument support apparatus to:

obtain a first result for a sample within a laboratory information management system, the first result representing a first type of result;

process, within the laboratory information management system, the first result via a univariate machine learning model trained using unsupervised machine learning;

in response to the univariate machine learning model generating a normal output for the first result, process, within the laboratory information management system, a plurality of results for the sample via a multivariate machine learning model, the plurality of results including the first result and each of the plurality of results representing a different type of result for the sample, the multivariate machine learning model trained using unsupervised machine learning; and in response to the multivariate machine learning model generating an abnormal output for the plurality of samples, flag, within the laboratory information management system, the sample for rejection processing.

* * * * *